United States Patent
Kittel

(10) Patent No.: US 11,629,691 B2
(45) Date of Patent: Apr. 18, 2023

(54) VERTICAL AXIS TURBINE

(71) Applicant: AXIS ENERGY GROUP PTY LTD, Southpoint (AU)

(72) Inventor: Peter Kittel, Mermaid Waters (AU)

(73) Assignee: AXIS ENERGY GROUP PTY LTD, Southpoint (AU)

( * ) Notice: Subject to any disclaimer, the term of this patent is extended or adjusted under 35 U.S.C. 154(b) by 0 days.

(21) Appl. No.: 16/976,175

(22) PCT Filed: Feb. 28, 2019

(86) PCT No.: PCT/AU2019/000025
§ 371 (c)(1),
(2) Date: Aug. 27, 2020

(87) PCT Pub. No.: WO2019/165490
PCT Pub. Date: Sep. 6, 2019

(65) Prior Publication Data
US 2020/0408191 A1 Dec. 31, 2020

(30) Foreign Application Priority Data
Feb. 28, 2018 (AU) .................... 2018900657

(51) Int. Cl.
*F03D 3/00* (2006.01)
*F03D 3/06* (2006.01)
*F03D 3/02* (2006.01)

(52) U.S. Cl.
CPC ............. *F03D 3/005* (2013.01); *F03D 3/061* (2013.01); *F03D 3/02* (2013.01); *F05B 2240/212* (2013.01); *F05B 2250/25* (2013.01)

(58) Field of Classification Search
CPC .......... F03D 3/005; F03D 3/007; F03D 3/061; F03D 3/02; F05D 2240/212; F05B 2240/214
See application file for complete search history.

(56) References Cited

U.S. PATENT DOCUMENTS

2011/0084495 A1\* 4/2011 Wu .................. F03D 3/005 290/55
2012/0163976 A1 6/2012 Batista
(Continued)

FOREIGN PATENT DOCUMENTS

DE   10125299 A1   5/2001
DE   102011118844 B3   4/2013
(Continued)

OTHER PUBLICATIONS

Schulze, English translation of DE10125299, May 16, 2001 (Year: 2001).*

(Continued)

*Primary Examiner* — Richard A Edgar
*Assistant Examiner* — Michael K. Reitz
(74) *Attorney, Agent, or Firm* — Tarolli, Sundheim, Covell & Tummino LLP

(57) ABSTRACT

A vertical axis turbine includes a rotatable hub assembly that is configured to be connected to an energy sink and rotatable about an axis of rotation. At least two blades are mounted on the hub assembly, each blade including a leading edge and a trailing edge, the blades being oriented so that the respective leading edges face in a common rotational direction. Each blade further includes a straight section that is substantially parallel to the axis of rotation and two helical sections, the straight section being interposed between the helical sections, and the helical sections extending at least partially around the axis of rotation.

19 Claims, 16 Drawing Sheets

(56) References Cited

U.S. PATENT DOCUMENTS

2013/0183164 A1    7/2013  Silvert
2017/0096985 A1*  4/2017  Bardia .................... F03D 13/20

FOREIGN PATENT DOCUMENTS

DE       102016111676 A1   12/2017
WO      2005010353 A2    2/2005

OTHER PUBLICATIONS

Extended European Search Report dated Jun. 29, 2021 for EP Application No. 19761279.9.
International Search Report dated May 6, 2019 for corresponding International Application No. PCT/AU2019/000025.

* cited by examiner

SECTION A-A

SECTION B-B
Cross-section only

VERTICAL AXIS TURBINE

FIELD

Various embodiments of a vertical axis turbine are described in this specification.

BACKGROUND

Turbines are in common use for the generation of energy. Generally, they are connected to some form of energy sink, such as an electrical generator or a pump.

One class of turbines is that known as vertical axis turbines. A vertical axis turbine is that type of turbine having a main rotor shaft set transverse to flow. The main rotor shaft need not be vertical in operation.

Vertical axis turbines are provided in various configurations or models. Early models included the Darrieus wind turbine (U.S. Pat. No. 1,835,018), the Savonius wind turbine (U.S. Pat. Nos. 1,697,574 and 1,766,765) and the Giromill (U.S. Pat. No. 1,835,018). A known problem with such turbines is torque variation generated by the main rotor shaft. Another known problem is the large bending moments set up in the blades during periods of high winds.

Another problem with conventional vertical axis turbines is that self-starting can be an issue.

It is advantageous to achieve wind energy generation in a built environment. There are problems with such environments. Wind speeds can be too low for conventional turbines. The flow of wind can also be too turbulent for conventional turbines. Furthermore, power production needs to be reliable and curves for long enough periods of time so that the energy produced is affordable and cost-competitive with an existing electrical grid.

SUMMARY

According to one aspect, there is provided a vertical axis turbine that includes:
a rotatable hub assembly that is configured to be connected to an energy sink and rotatable about an axis of rotation; and
at least two blades that are mounted on the hub assembly, each blade including a leading edge and a trailing edge, the blades being oriented so that the respective leading edges face in a common rotational direction, and each blade further including:
  a straight section that is substantially parallel to the axis of rotation; and
  two helical sections, the straight section being interposed between the helical sections, and the helical sections extending at least partially around the axis of rotation.

The blades may be substantially identical to each other. The blades may be substantially equally spaced from each other.

The helical sections of each blade may extend in a common rotational direction about the shaft. Alternatively, the helical sections may extend in opposite directions about the shaft.

The helical sections of each blade may be substantially identical to each other.

The helical sections may constitute between approximately 30% and 80% of a span of each blade. In one example, the helical sections constitute approximately two thirds of a span of each blade. In another example, the helical sections constitute approximately one third of a span of each blade.

The blades may have a constant pitch angle along their lengths. Alternatively, the pitch angle of the blades may vary along their lengths.

The blades may have a constant camber along their lengths. Alternatively, the camber can vary along their lengths. In other embodiments, the blades may be entirely without camber. Alternatively, the helical sections may be cambered while the straight sections are without camber.

The blades may each have end plates at their tips. Plates may also be provided at junctions between the helical and straight sections.

The hub assembly may include a shaft. At least one strut may connect each respective blade to the shaft.

The turbine may include three blades. Two struts may connect each blade to the shaft.

DETAILED DESCRIPTION

Figure 1:
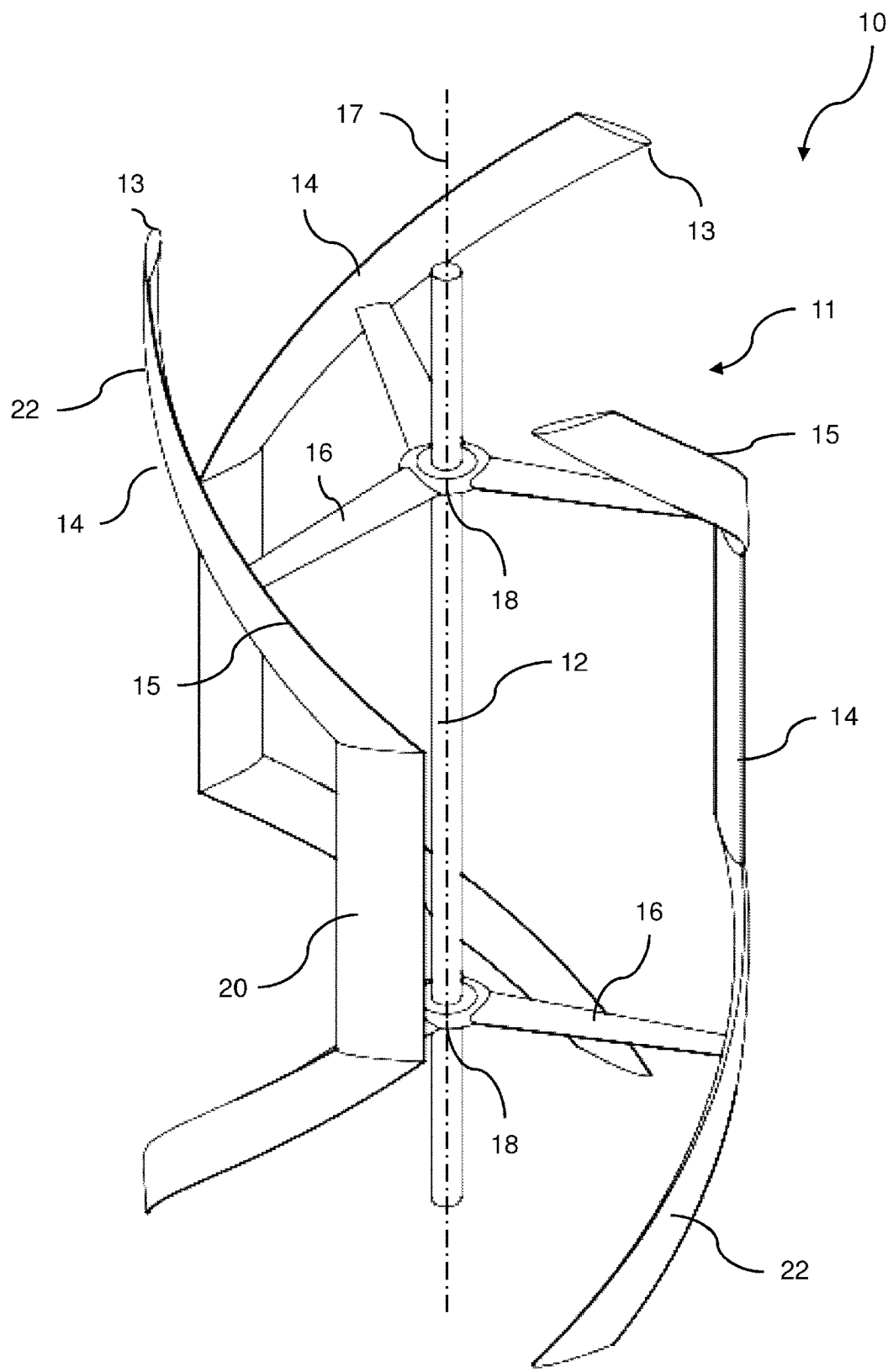
FIG. 1 shows a three-dimensional view of an example of a turbine.
Figure 2:
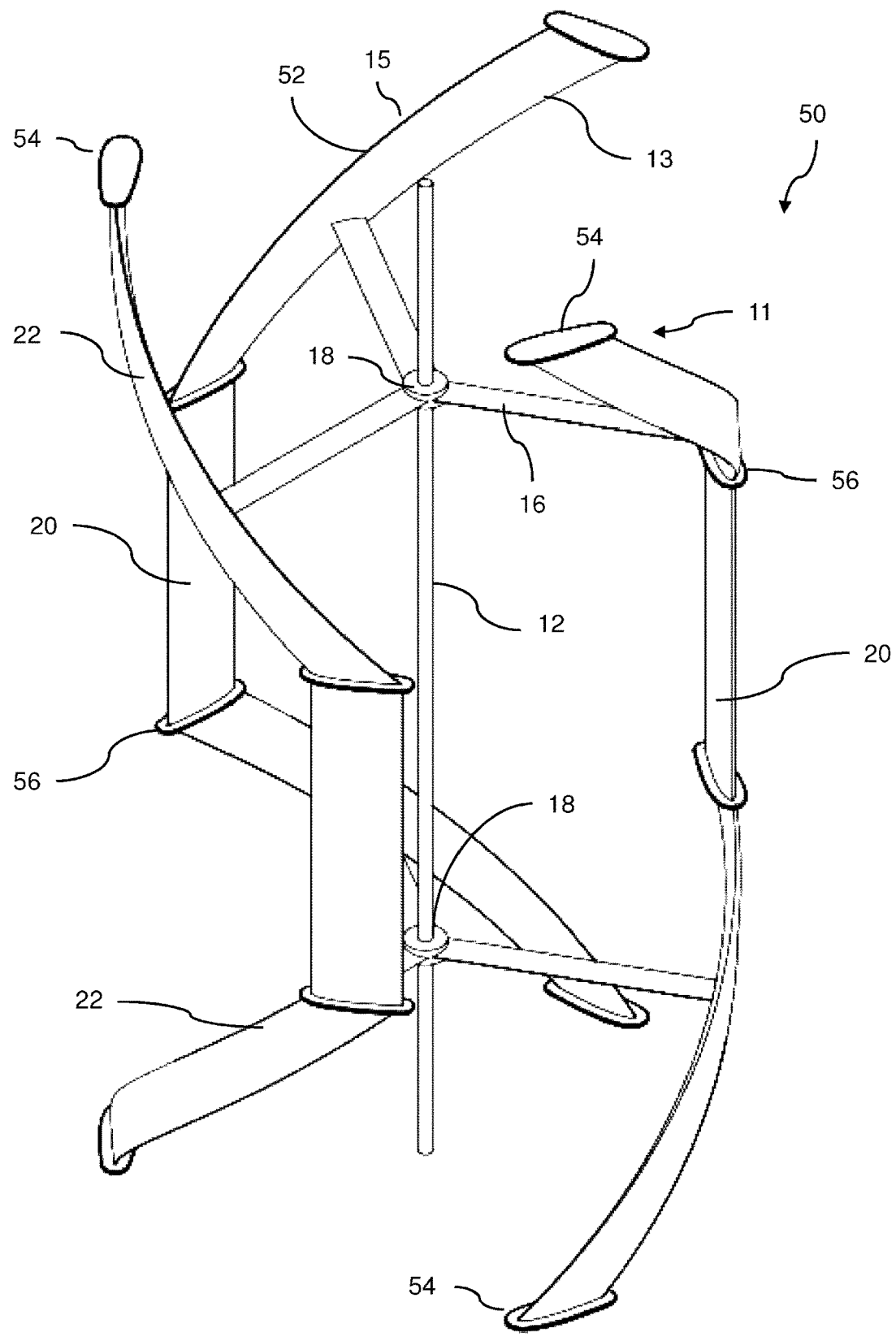
FIG. 2 shows a three-dimensional view of another example of a turbine.
Figure 3:
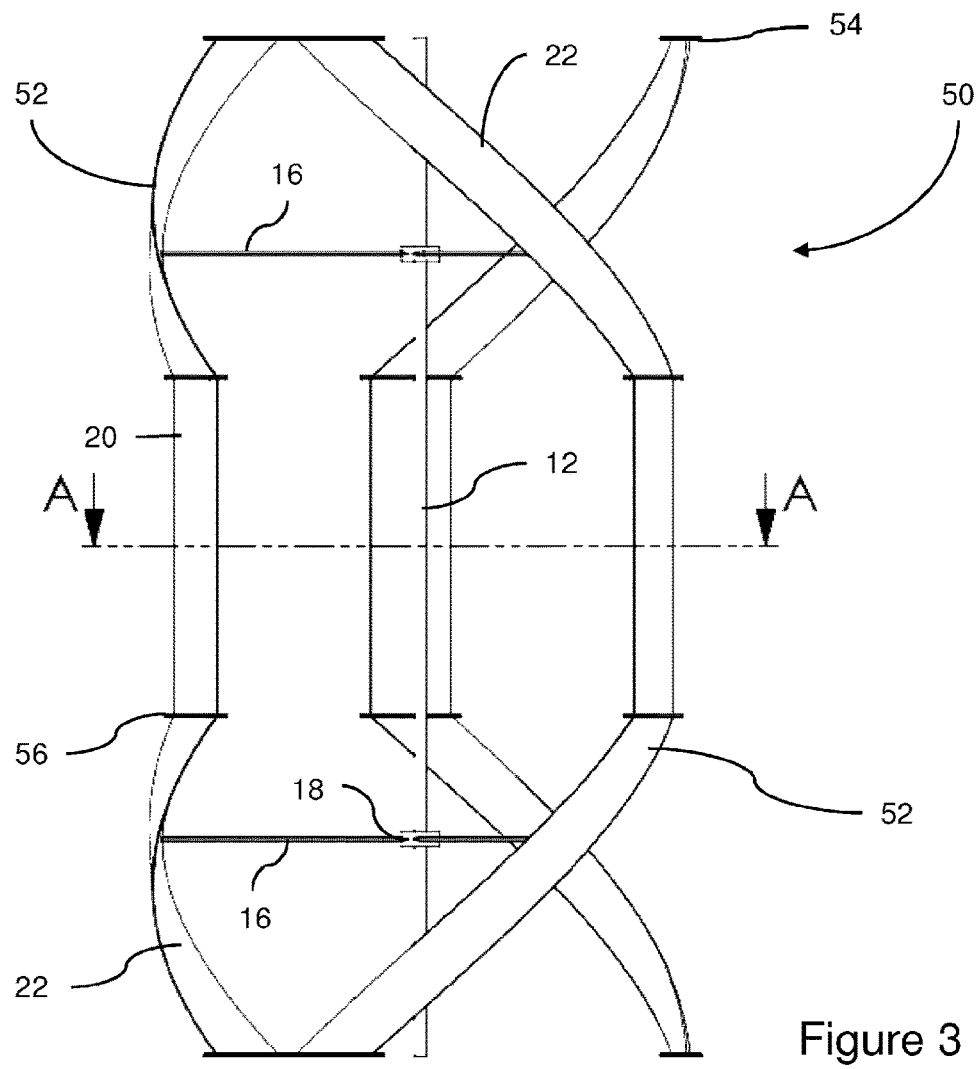
FIG. 3 shows a side view of the turbine of FIG. 2.
Figure 4:
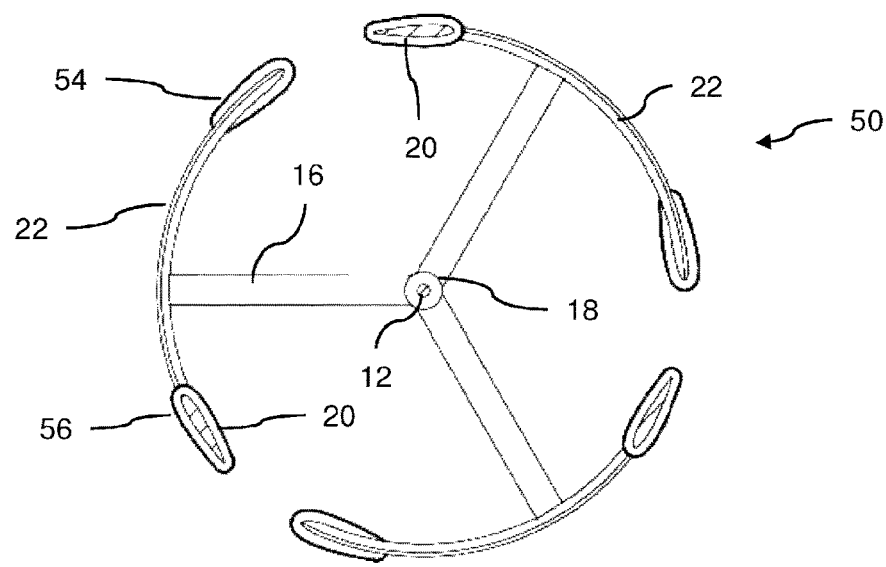
FIG. 4 shows a section through A-A in FIG. 3.
Figure 5:
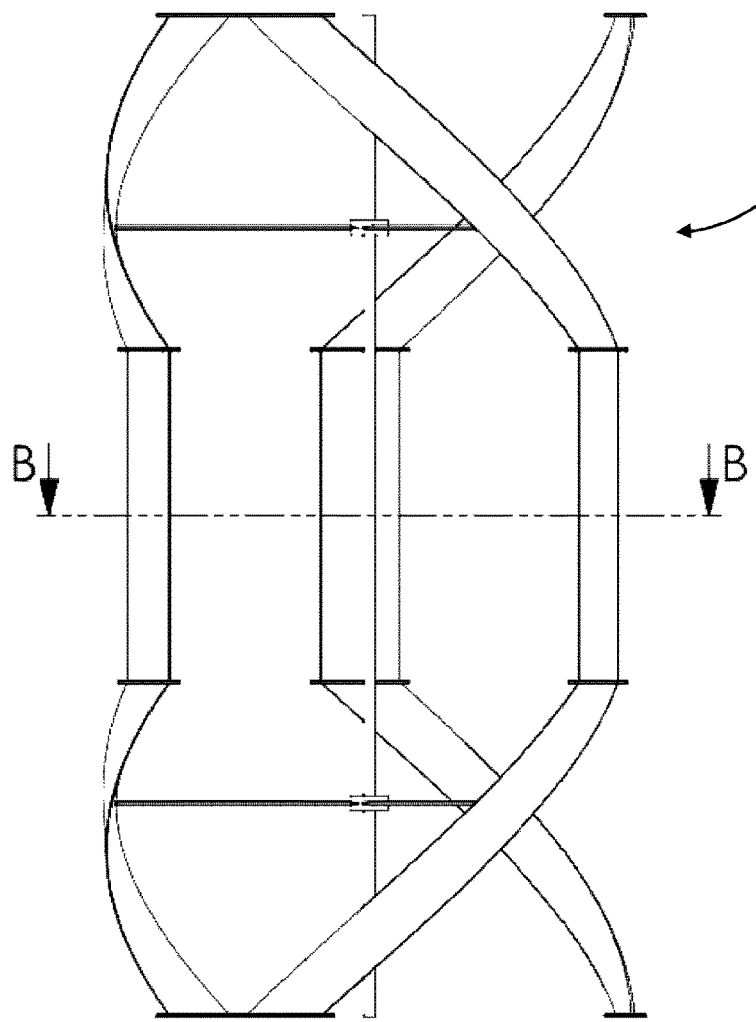
FIG. 5 shows another side view of the turbine of FIG. 2.
Figure 6:
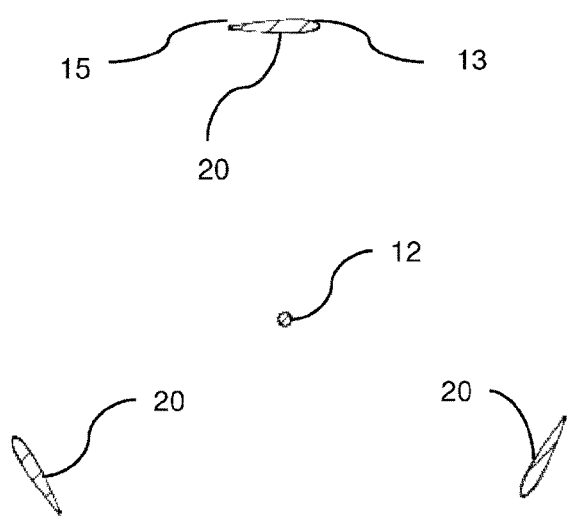
FIG. 6 shows a section, through B-B in FIG. 5, of just the blades and a shaft of the turbine of the sort exemplified in FIG. 2.

In FIG. 1, reference numeral 10 generally indicates a turbine.

The turbine 10 includes a rotatable hub assembly or rotor 11 that is configured to be connected to an energy sink and rotatable about an axis of rotation 17. The rotor 11 includes a shaft 12.

Three blades 14 are mounted on the shaft 12 with struts 16. In this example, two spaced collars 18 are mounted on the shaft 12. A set of three struts 16 interconnect each collar 18 and each respective blade 14. Thus, the rotor 11 includes six struts 16. The struts 16 extend radially from the shaft 12 and have a common length. The blades 14 are generally positioned in a cylindrical plane with the axis of rotation 13 coincident with the shaft 12.

Each blade 14 includes a straight or operatively vertical section 20 that is substantially parallel to the axis of rotation of the shaft 12 and two helical sections 22. The straight section 20 of each blade 14 is interposed between the helical sections 22. The helical sections 22 extend or wrap partially around the axis of rotation 13 of the shaft 12.

Each blade 14 has a leading edge 13 and a trailing edge 15.

The struts 16 interconnect respective helical sections 22 and the shaft 12. The straight or vertical sections 20 can be centrally positioned between each set of struts 16.

The length of the struts 16 can range from about 0.5 m to about 15 m. Thus, the radial distance of the blades 14 from the shaft 12 can range from 0.5 m to 15 m. At the lower end, the turbine 10 would, for example, have a rated capacity of less than about 1 kW. At the upper end, the turbine 10 would have a capacity of more than about 500 kW.

The blades 14 are substantially identical to each other. However, in some embodiments, the blades 14 would not necessarily be substantially identical to each other, provided rotational balancing problems did not arise.

The helical sections 22 of the blades 14 extend in a common rotational direction about the shaft 12. In other embodiments, the helical sections 22 of each blade 14 may extend in opposite rotational directions. The inclination of the helical sections 22 with respect to the blades 14, in the cylindrical plane, ranges from approximately 10° to 60°. An overall blade height or blade length of the blades 14 ranges from about 1.5 m to about 60 m. At the lower end, the turbine 10 would, for example, have a rated capacity of less than about 1 kW. At the upper end, the turbine 10 would have a capacity of more than about 500 kW.

A cross-sectional profile of the blades 14 can be symmetrical or cambered. If cambered, the blades can have a constant camber along their lengths. Alternatively, the blades can have a camber that varies along their lengths.

A chord length of each blade 14 can vary depending on the number of blades used and the overall dimensions of the rotor 11. For example, the chord length can vary from about 75 mm to 5 m.

A pitch of the blades 14 can be maintained between −10° to 0°, toe-out (i.e. the leading edge 13 of the blades 14 directed outwardly with respect to the cylindrical plane of the blades and the trailing edge 15 directed inwardly with respect to the cylindrical plane).

The helical sections 22 of the blades 14 extend in a common rotational direction about the shaft 12. In other embodiments, the helical sections 22 of each blade 14 extend in opposite rotational directions (see, for example, FIG. 11).

The helical sections 22 of the blades 14 are substantially identical to each other. In one embodiment, the helical sections 22 each constitute between about 30% to 80%, for example about one third of the span of each blade 14. In another embodiment, the helical sections 22 constitute about two thirds or about 60% of the span of each blade 14. In another embodiment, the helical sections constitute about one third or about 40% of the span of each blade 14.

The blades 14 can have a constant pitch angle along their lengths. In other embodiments, the pitch angle can vary. The inventor(s) believes that there can be a benefit in having a variable pitch angle along the blade, especially when the cross-sectional profile varies as a given profile would perform differently at various pitch angles. For example, one profile could create maximum lift for a pitch angle of −2° while another may do so for −5°. The pitch angle should vary accordingly to maximise overall performance if both profiles are featured in the blades 14.

A cross-sectional profile or camber of each blade 14 can be constant or can vary along the length of each blade 14. For the reasons given above in connection with the pitch angle, the inventor(s) believes that there can be a benefit in having a variable camber along the length of each blade 14. Thus, in some embodiments, the camber can vary along the lengths of the blades 14. In other embodiments, the blades 14 can be entirely without camber. Alternatively, the helical sections 22 can be cambered while the straight sections 20 are without camber.

The blades 14 can have a NACA airfoil shape. For example, the blades 14 can have a NACA 0015 airfoil shape.

In this embodiment, there are two sets of the struts 16. It was considered that having three sets of struts was preferable from a structural point of view. However, this is not practical from an aerodynamic point of view since each set of struts reduces the overall torque by about 5% in terms of Cp (Coefficient of Performance). A compromise was to use the two sets of struts 16. Each set is spaced equally from a mid-section or the vertical sections 20 of the blades 14 and at locations that minimise deflection of tips and the vertical sections 20 of the blades 14.

The struts 16 can have a range of shapes that are selected to minimise drag. In one example, the struts have an airfoil shape. A chord length of the struts 16 can then be minimised.

An extensive search for an appropriately shaped strut was undertaken. This problem was relatively complex because the performance of any given airfoil depends on the Reynolds number, which is a measure of the importance of inertia to viscous effects. The Reynolds number is greatly affected by local speed and length of the object, in this case the struts. The difficulty resides in the fact that along the struts local speed changes, hence Reynolds number changes. Since the performance of an airfoil is Reynolds-number dependent, a given airfoil can be the optimal choice at the mid-section of the strut but not near the shaft of the blade. The optimal strut would therefore be made of a continuously varying airfoil section which would result in possible structural issues as well as increased cost of manufacturing. There was also uncertainty as to whether CFD modelling would be able to capture such changes on a coarse mesh that was used for carrying out simulations. Considerations were also given to an airfoil with a concave back section so that wind can exert thrust and push the struts in the right direction of rotation, helping self-start capability. It was feared, however, that these struts would only be beneficial at start-up and that they could additional drag during operation, hindering performance.

It was decided to investigate a simple strut option instead in order to reduce manufacturing costs. It was assumed that a small flat plate shape with rounded edges would slightly decrease the performance when compared with an airfoil shape. Due to the simpler shape and since impact on the overall performance was small, such a strut was considered the preferred option.

In FIGS. 2 to 6, reference numeral 50 generally indicates another example of a turbine. Like reference numerals refer to like parts with reference to the preceding figures. Furthermore, any dimensions, values or principles of operation described with reference to the turbine 10 and the components of the turbine 10 are, unless expressly indicated otherwise, applicable to the turbine 50. The use of common reference numerals is not intended to indicate that a component from a different embodiment is essential to the turbine 50.

Three blades 52 are mounted on the shaft 12 with the struts 16 as with the turbine 10. An end plate 54 is mounted on an end of each helical section 22. Plates 56 are also mounted on the blades 52 at junctions between the straight section 20 and the helical sections 22. The blades 52 can have a profile similar to that of the blades 14.

The end plates 54 serve to limit blade tip vortex shedding. The end plates 54 also serve to provide a convenient way to connect blades together, if necessary.

The plates 56 serve to inhibit flows on the sections 20, 22 from mixing, thereby optimising performance of the sections 20, 22.

The turbine 50 may have dimensions and configurations to suit various applications. For example, multiple turbines 50 may be provided, end-to-end, which may be a determining size factor. This aspect is described in more detail below, with reference to FIGS. 12 and 13. Alternatively, one turbine 50 can be provided with a suitable dimension. In one example, the turbine 50 can have an overall height of between about 1.5 m and 30 m and a width or diameter of between about 1 m and 30 m. For example, the turbine 50 can have a height of 3.3 m and a width or diameter of about 1.7 m.

Figure 7:
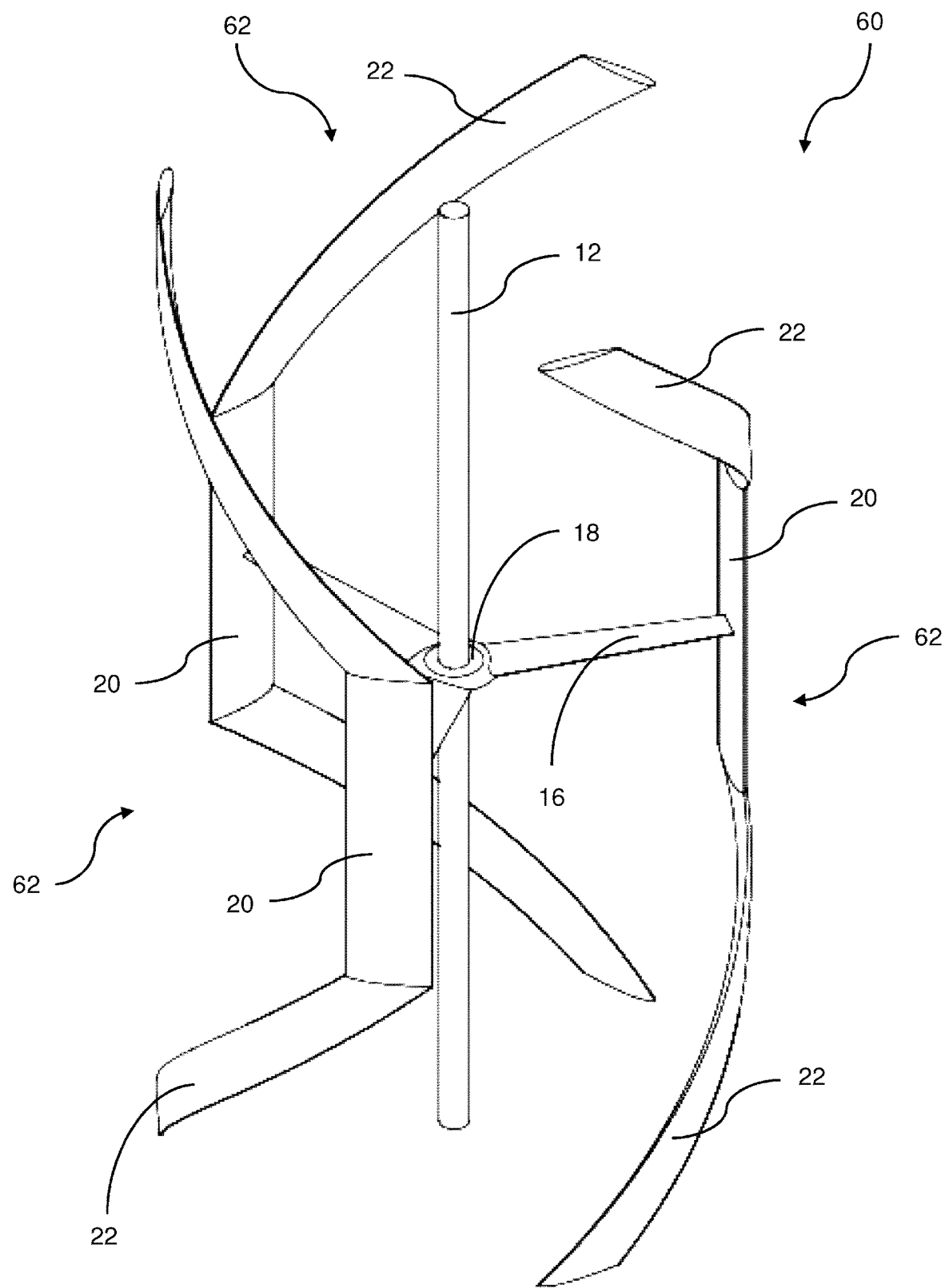
FIG. 7 shows a three-dimensional view of another example of a turbine.

In FIG. 7, reference numeral 60 generally indicates another example of a turbine. Like reference numerals refer to like parts with reference to the preceding figures. Furthermore, any dimensions, values or principles described in respect of the turbine 10, 50 are, unless expressly indicated otherwise, applicable to the turbine 60 and the components of the turbine 60. The use of common reference numerals is not intended to indicate that a component from a different embodiment is essential to the turbine 60.

Three blades 62 are mounted on the shaft 12, each with a single strut 16. The blades 62 in this example are as described for turbine 10, except that the three blades 62 are each mounted on the shaft 12 with a single respective strut 16. In this example, a single collar 18 is mounted on the shaft 12. Three struts 16 interconnect the collar 18 and each respective blade 14. Thus, the rotor 11 includes three struts 16. The struts 16 extend radially from the shaft 12 and have a common length. The blades 14 are generally positioned in a cylindrical plane with an axis of rotation that is coincident with the shaft 12.

The struts 16 interconnect respective straight sections 20 and the shaft 12.

Figure 8:
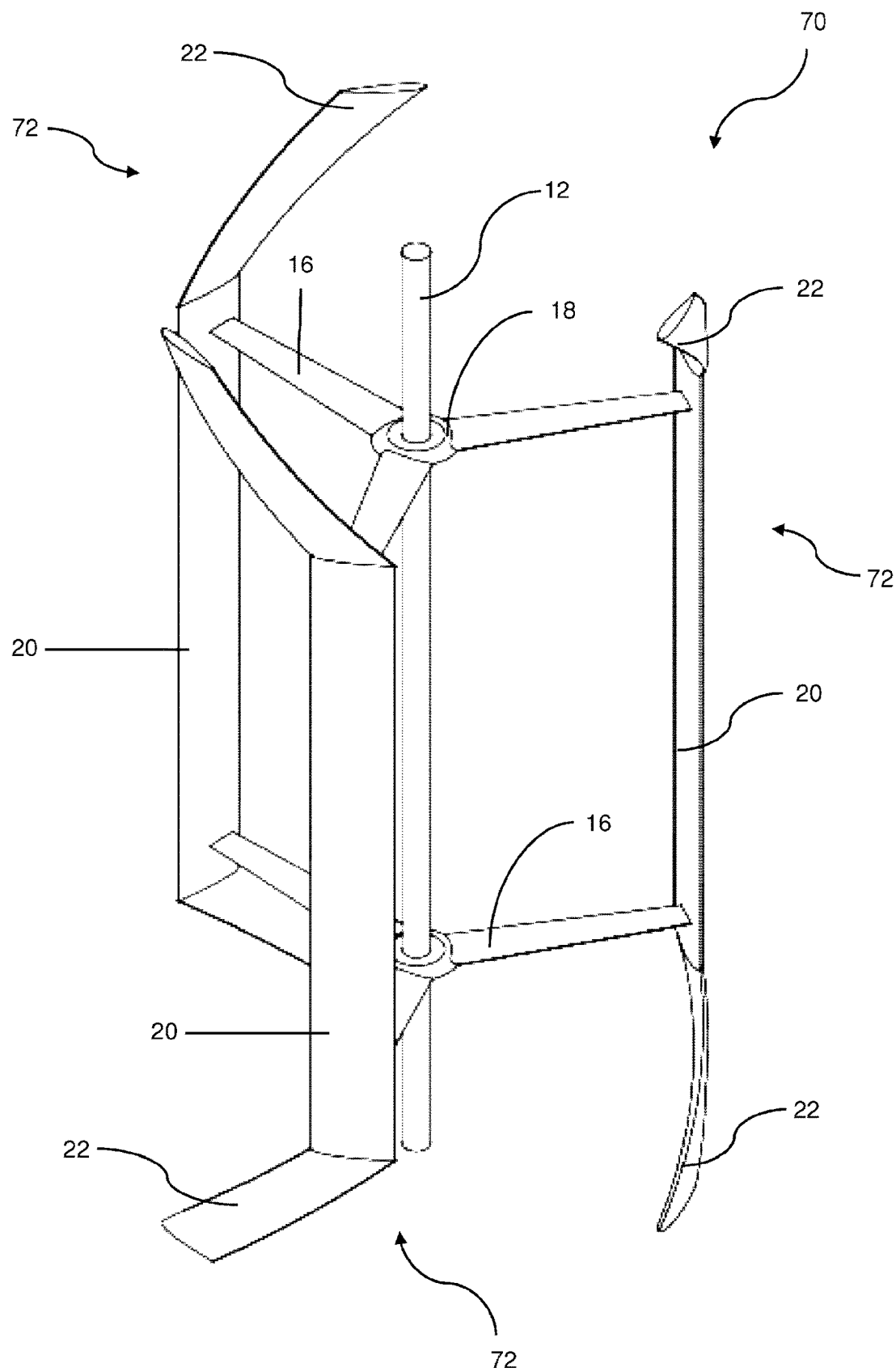
FIG. 8 shows a three-dimensional view of a further example of a turbine.

In FIG. 8, reference numeral 70 generally indicates another example of a turbine. Like reference numerals refer to like parts with reference to the preceding figures. Furthermore, any dimensions, values or principles described in respect of the turbine 10 are, unless expressly indicated otherwise, applicable to the turbine 70 and the components thereof. The use of common reference numerals is not intended to indicate that a component from a different embodiment is essential to the turbine 70.

Three blades 72 are mounted on the shaft 12 with the struts 16. In this example, two spaced collars 18 are mounted on the shaft 12. Three struts 16 interconnect each collar 18 and each respective blade 72. Thus, the rotor 11 includes six struts 16. The struts 16 extend radially from the shaft 12 and have a common length. The blades 72 are generally positioned in a cylindrical plane with an axis of rotation that is coincident with the shaft 12.

Each blade 72 includes a straight section 20 that is substantially parallel to the axis of rotation of the shaft 12 and two helical sections 22. The straight section 20 of each blade 72 is interposed between the helical sections 22. The helical sections 22 extend or wrap partially around the axis of rotation of the shaft 12 in a common direction.

The struts 16 interconnect respective straight sections 20 and the shaft 12.

The blades 72 are substantially identical to each other. In this example, the helical sections 22 each constitute about one sixth of the span of each blade 72.

The helical sections 22 of the blades 72 extend in a common rotational direction about the shaft 12.

Figure 9:
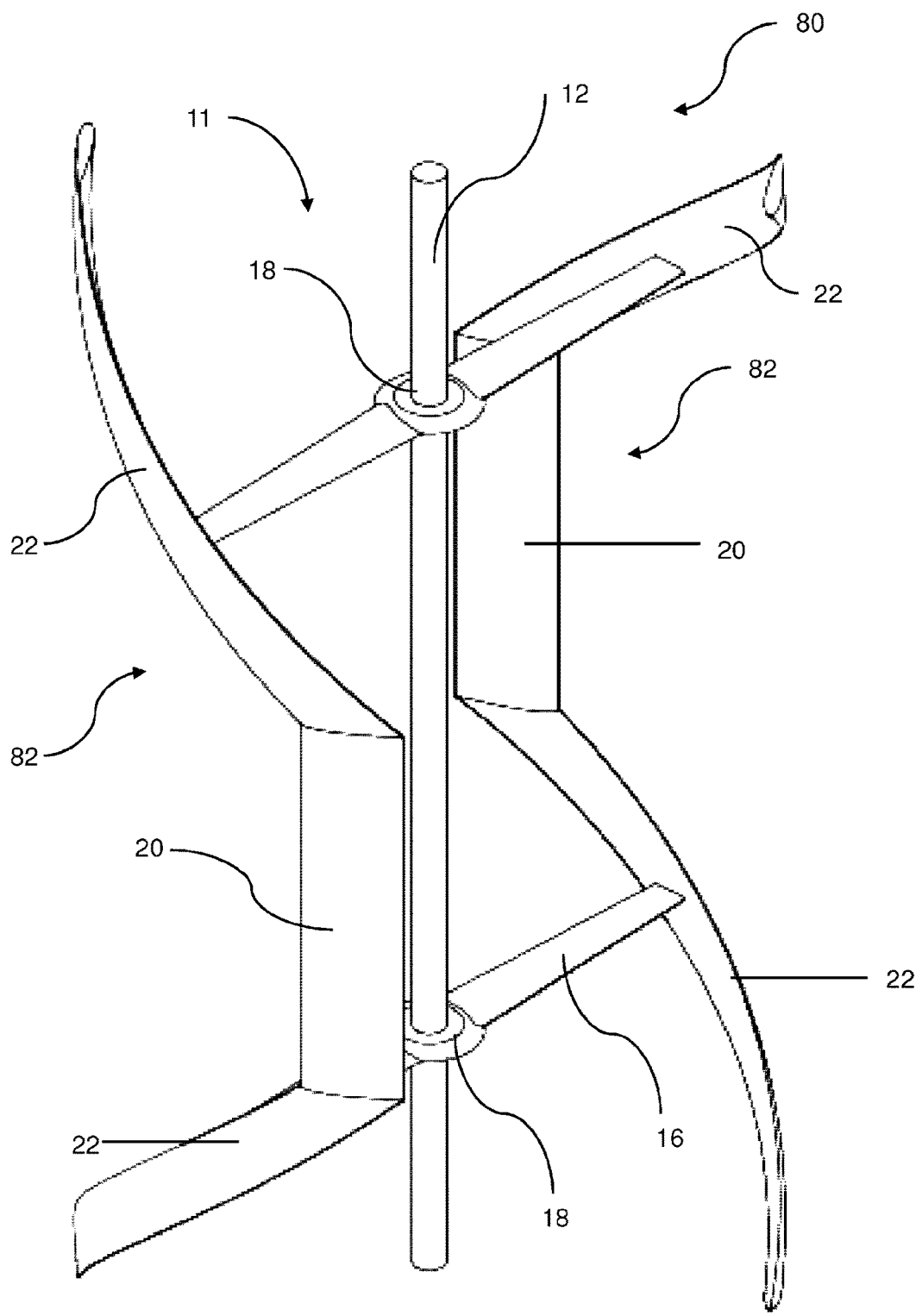
FIG. 9 shows a three-dimensional view of another example of a turbine.

In FIG. 9, reference numeral 80 generally indicates another example of a turbine. Like reference numerals refer to like parts with reference to the preceding figures. Furthermore, any dimensions, values or principles described in respect of the turbine 10 are, unless expressly indicated otherwise, applicable to the turbine 80 and the components thereof. The use of common reference numerals is not intended to indicate that a component from a different embodiment is essential to the turbine 80.

Two blades 82 are mounted on the shaft 12 with the struts 16. In this example, two spaced collars 18 are mounted on the shaft 12. Two struts 16 interconnect each collar 18 and each respective blade 82. Thus, the rotor 11 includes four struts 16. The struts 16 extend radially from the shaft 12 and have a common length. The blades 82 are generally positioned in a cylindrical plane with an axis of rotation that is coincident with the shaft 12.

The struts 16 interconnect respective helical sections 22 and the shaft 12.

The blades 82 are substantially identical to each other. In this example, the helical sections 22 each constitute about one third of the span of each blade 82.

The helical sections 22 of the blades 72 extend in a common rotational direction about the shaft 12.

Figure 10:
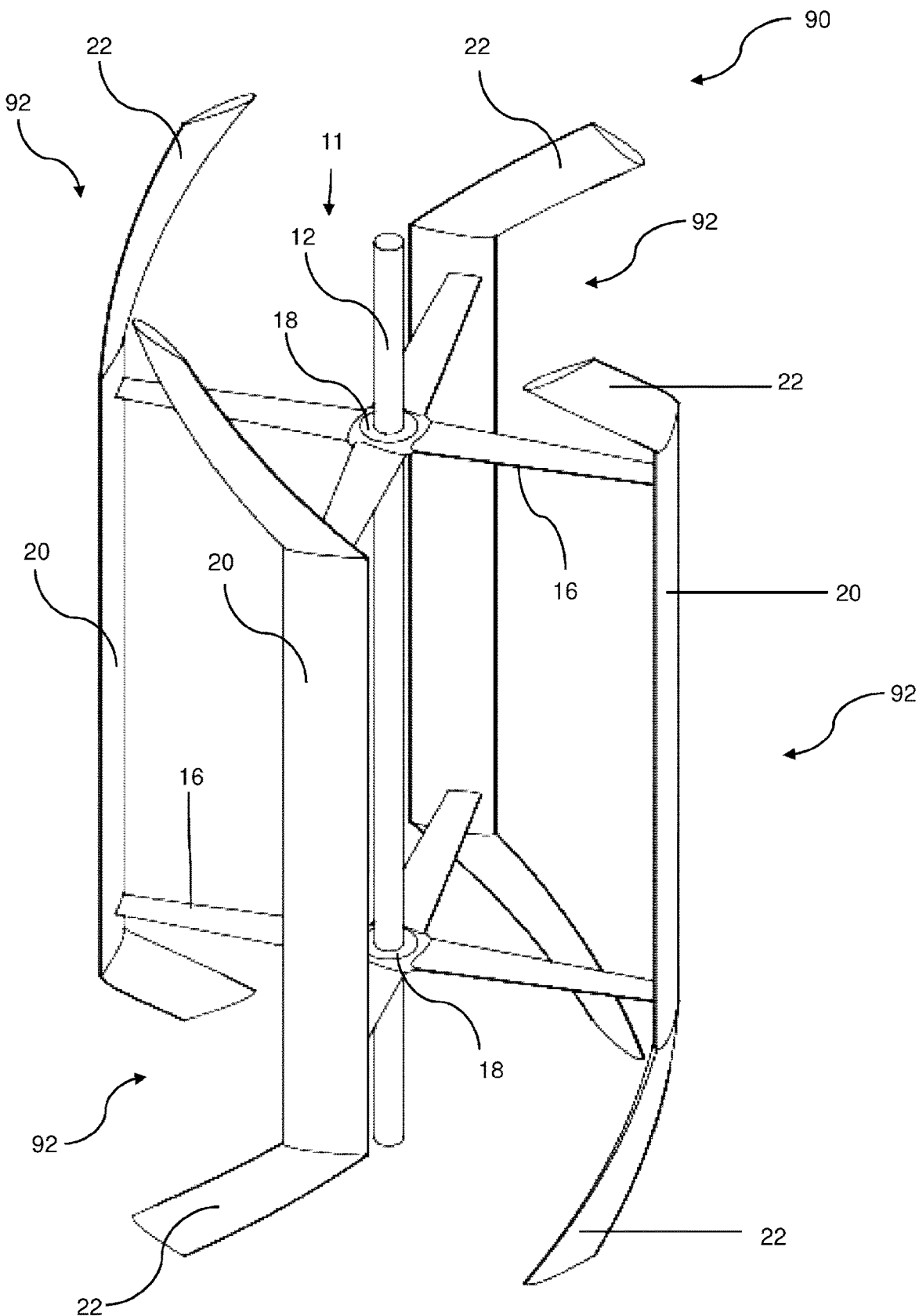
FIG. 10 shows a three-dimensional view of a further example of a turbine.

In FIG. 10, reference numeral 90 generally indicates another example of a turbine. Like reference numerals refer to like parts with reference to the preceding figures. Furthermore, any dimensions, values or principles described in respect of the turbine 10 are, unless expressly indicated otherwise, applicable to the turbine 90 and the components thereof. The use of common reference numerals is not intended to indicate that a component from a different embodiment is essential to the turbine 90.

Four blades 92 are mounted on the shaft 12 with struts 16. In this example, two spaced collars 18 are mounted on the shaft 12. Four struts 16 interconnect each collar 18 and each respective blade 92. Thus, the rotor 11 includes eight struts 16. The struts 16 extend radially from the shaft 12 and have a common length. The blades 92 are generally positioned in a cylindrical plane with an axis of rotation that is coincident with the shaft 12.

Each blade 92 includes a straight section 20 that is substantially parallel to the axis of rotation of the shaft 12 and two helical sections 22. The straight section 20 of each blade 92 is interposed between the helical sections 22. The helical sections 22 extend or wrap partially around the axis of rotation of the shaft 12.

The struts 16 interconnect respective straight sections 20 and the shaft 12.

The blades 92 are substantially identical to each other. In this example, the helical sections 22 each constitute about one sixth of the span of each blade 92.

The helical sections 22 of the blades 72 extend in a common rotational direction about the shaft 12.

Figure 11:
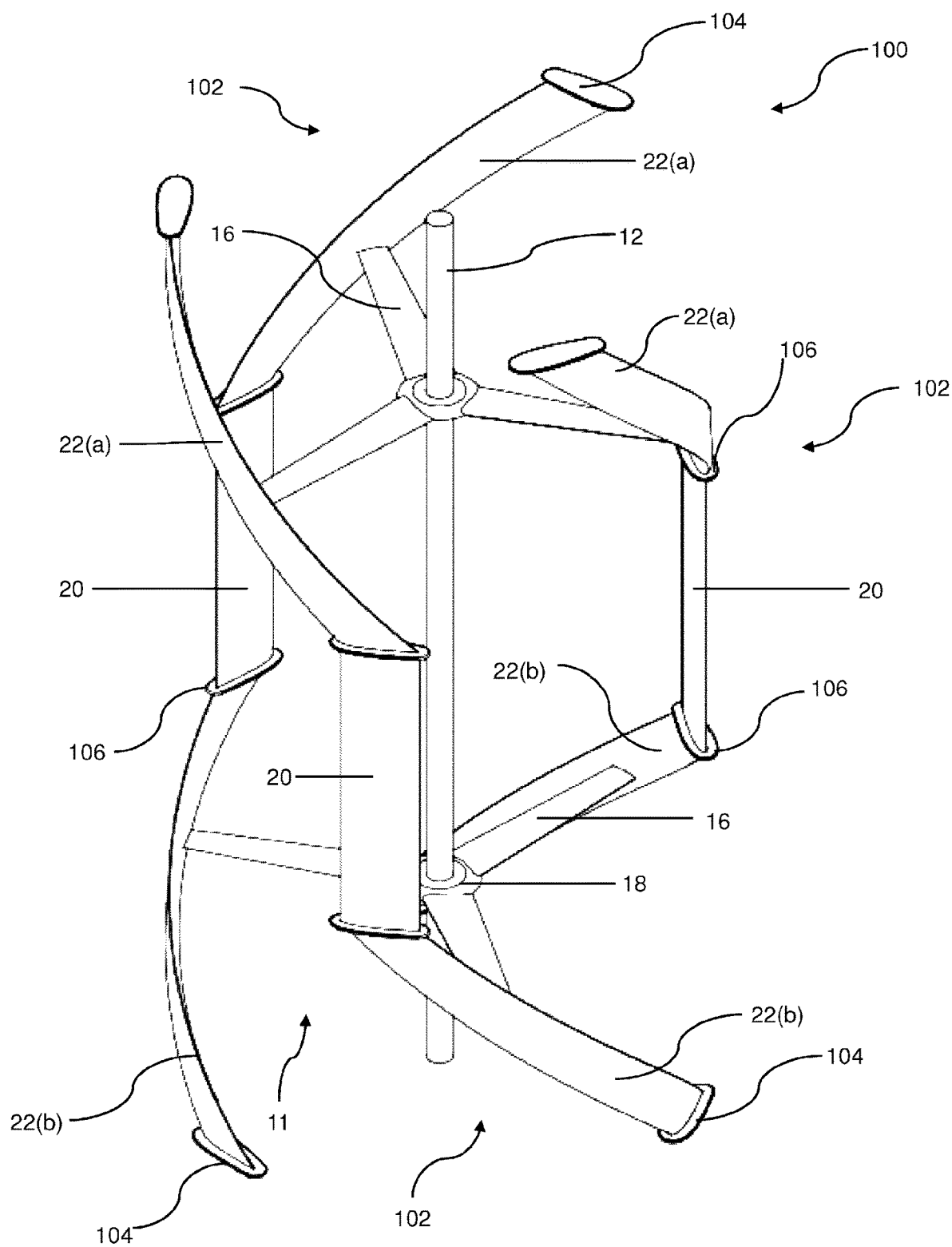
FIG. 11 shows a three-dimensional view of another example of a turbine.

In FIG. 11, reference numeral 100 generally indicates another example of a turbine. Like reference numerals refer to like parts with reference to the preceding figures. Furthermore, any dimensions, values or principles described in respect of the turbine 10 are, unless expressly indicated otherwise, applicable to the turbine 100 and the components thereof. The use of common reference numerals is not intended to indicate that a component from a different embodiment is essential to the turbine 100.

Three blades 102 are mounted on the shaft 12 with struts 16. In this example, two spaced collars 18 are mounted on the shaft 12. Three struts 16 interconnect each collar 18 and each respective blade 102. Thus, the rotor 11 includes six struts 16. The struts 16 extend radially from the shaft 12 and have a common length. The blades 82 are generally positioned in a cylindrical plane with an axis of rotation that is coincident with the shaft 12.

An end plate 104 is mounted on an end of each helical section 22. Plates 106 are also mounted on the blades 102 at junctions between the straight section 20 and the helical sections 22.

The end plates 104 serve to limit blade tip vortex shedding. The end plates 104 also serve to provide a convenient way to connect blades together, if necessary.

The plates 106 serve to inhibit flows on the sections 20, 22 from mixing, thereby optimising performance of the sections 20, 22.

The struts 16 interconnect respective helical sections 22 and the shaft 12.

The blades 102 are substantially identical to each other. In this example, the helical sections 22 each constitute about one third of the span of each blade 102.

In this example, helical sections 22(a) of the blades 102 extend in opposite directions to helical sections 22(b) about the shaft 12.

The turbines 60, 70, 80, 90 and 100 can have dimensions to suit various applications. For example, multiples of each of turbines 60, 70, 80, 90 and 100 can be provided, end-to-end, which could be a determining size factor. This aspect is described in more detail below, with reference to FIG. 14. Alternatively, one of each of the turbines 60, 70, 80, 90 and 100 can be provided with a suitable dimension. In one example, the turbine 60 can have an overall height of between about 1.5 m and 30 m and a width or diameter of between about 1 m and 30 m. For example, the turbine 50 can have a height of about 3.3 m and a width or diameter of about 1.7 m.

Figure 12:
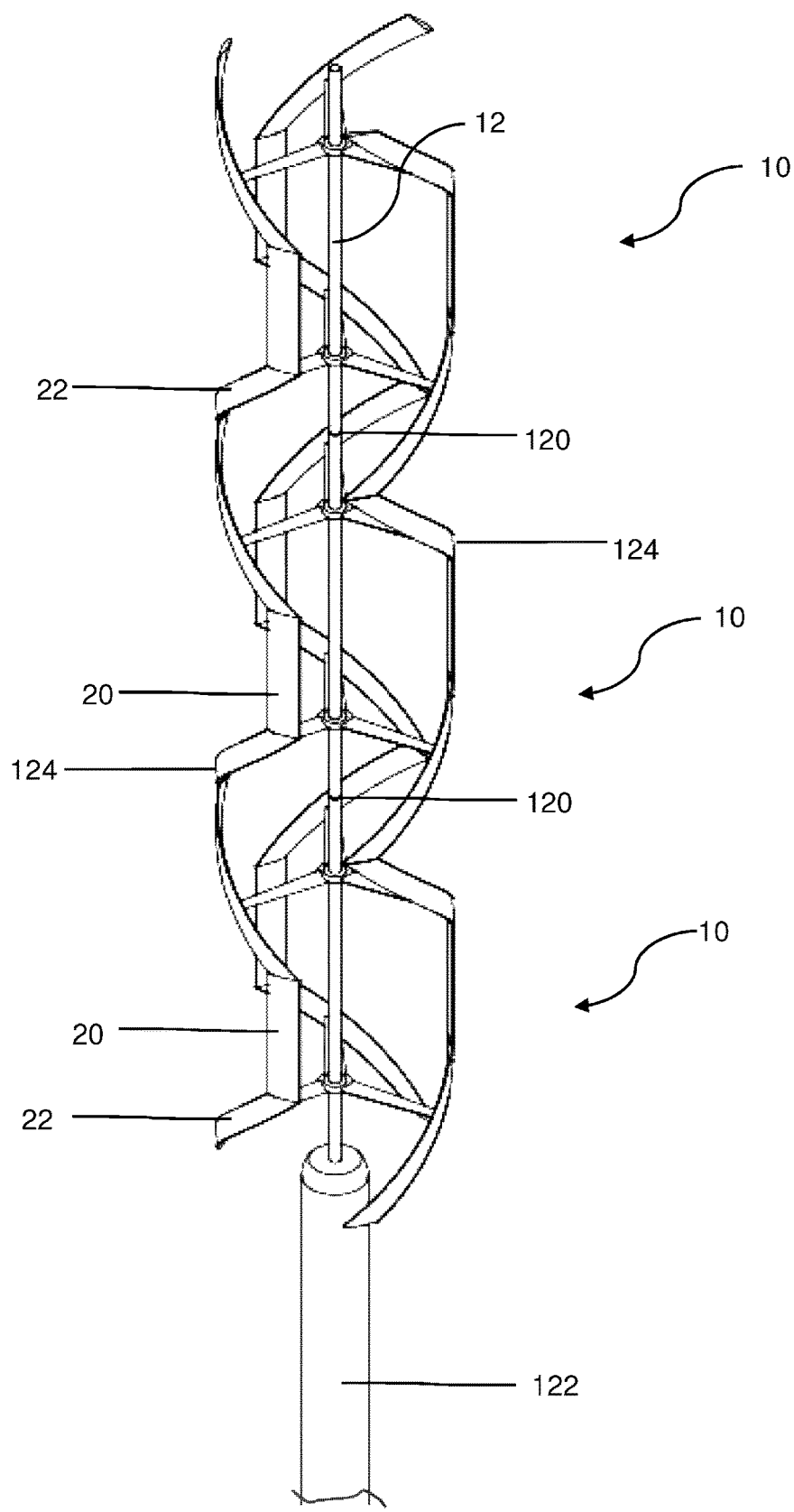
FIG. 12 shows an example of a single tower mast comprising more than one turbine of FIG. 1.

FIG. 12 shows a single tower constructed from a plurality of the turbines 10, connected along the shaft 12 at joints 120. The joints 120 can be any appropriate joint, reversible or permanent, for example a screw joint, a soldered joint, a push-fit joint. Each helical section 22 is also connected to the helical section 22 of an adjacent turbine 10 at joints 124. It will be appreciated that the turbines need not necessarily be connected in that configuration. Furthermore, the turbines could be connected just to the shaft 12 with the struts 16. The tower can be mounted on a support 122. Stacking multiple turbines on a tower in this way allows a greater power generation capacity for a given footprint. This modular arrangement has further benefits over the installation of a single, large turbine of the same capacity, since it allows ease of transport and installation: each tower comprises multiple compact and lightweight turbines that can be transported in bulk, easily lifted and quickly installed on-site, whereas a large turbine of the same capacity will be subject to complex logistics and will require oversized trucks or cargo planes for transport and heavy-duty cranes for installation. The shaft 12 can also be a single shaft of appropriate length, without any joints. In this configuration, the turbines 10 are attached at predetermined positions to the shaft 12.

Figure 13:
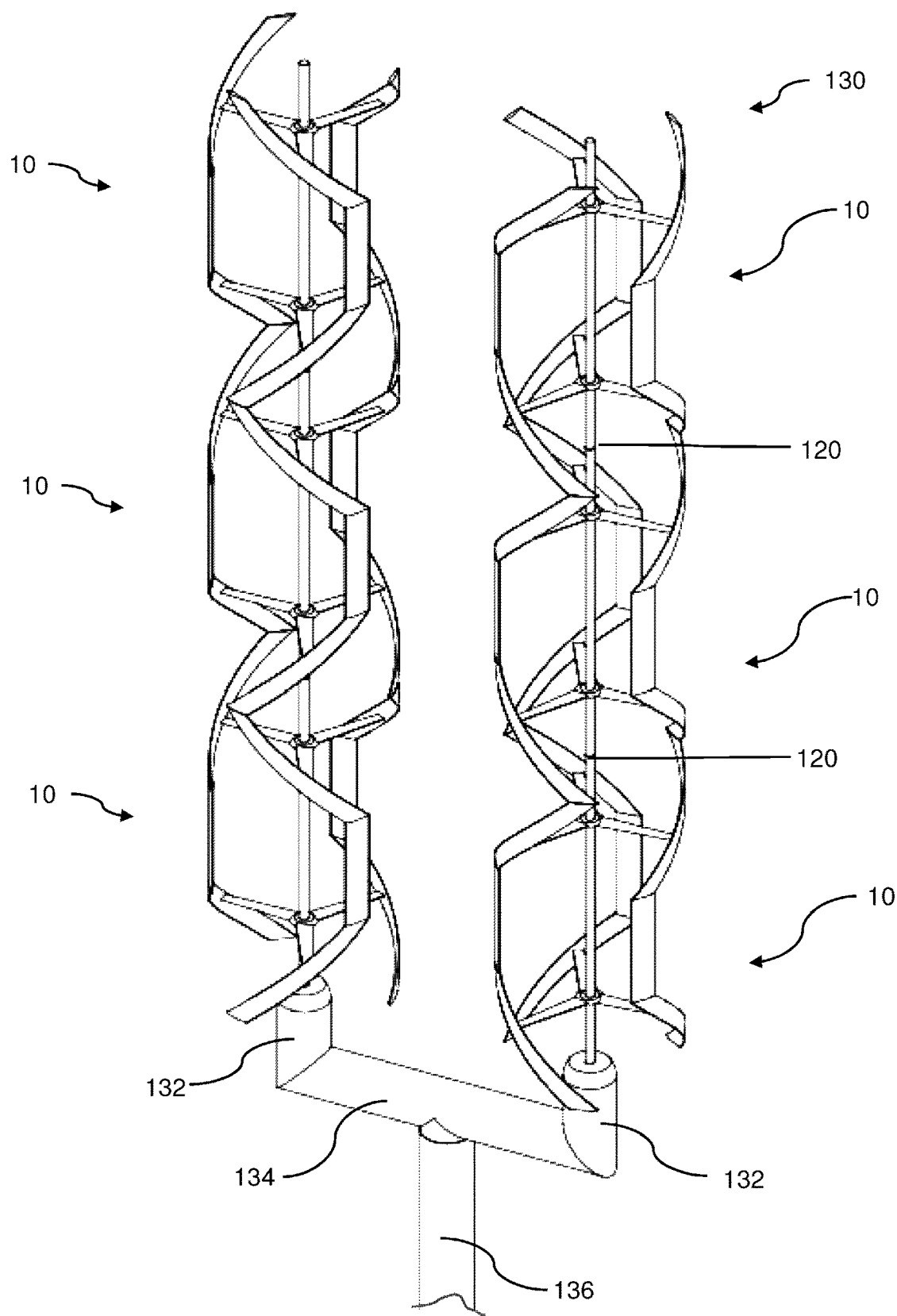
FIG. 13 shows an example of a double tower mast, each mast comprising more than one turbine of FIG. 1.

Another tower configuration 130 for a plurality of turbines, exemplified for the turbines 10, is shown in FIG. 13. In this configuration, each of two of the single towers shown in FIG. 12 is mounted on a respective mount 132. The mounts 132 are connected by a cross-bar 134 to a support 136. Once again, this configuration makes for ease of transport and installation of a number of turbines in a single location. In this configuration, the two turbine towers can be mounted so that they are counter-rotating: one turbine tower rotates in the clockwise direction, the other rotates in the anticlockwise direction. This action produces additional power when operating, due to positive flow interaction.

Figures 14, 15:
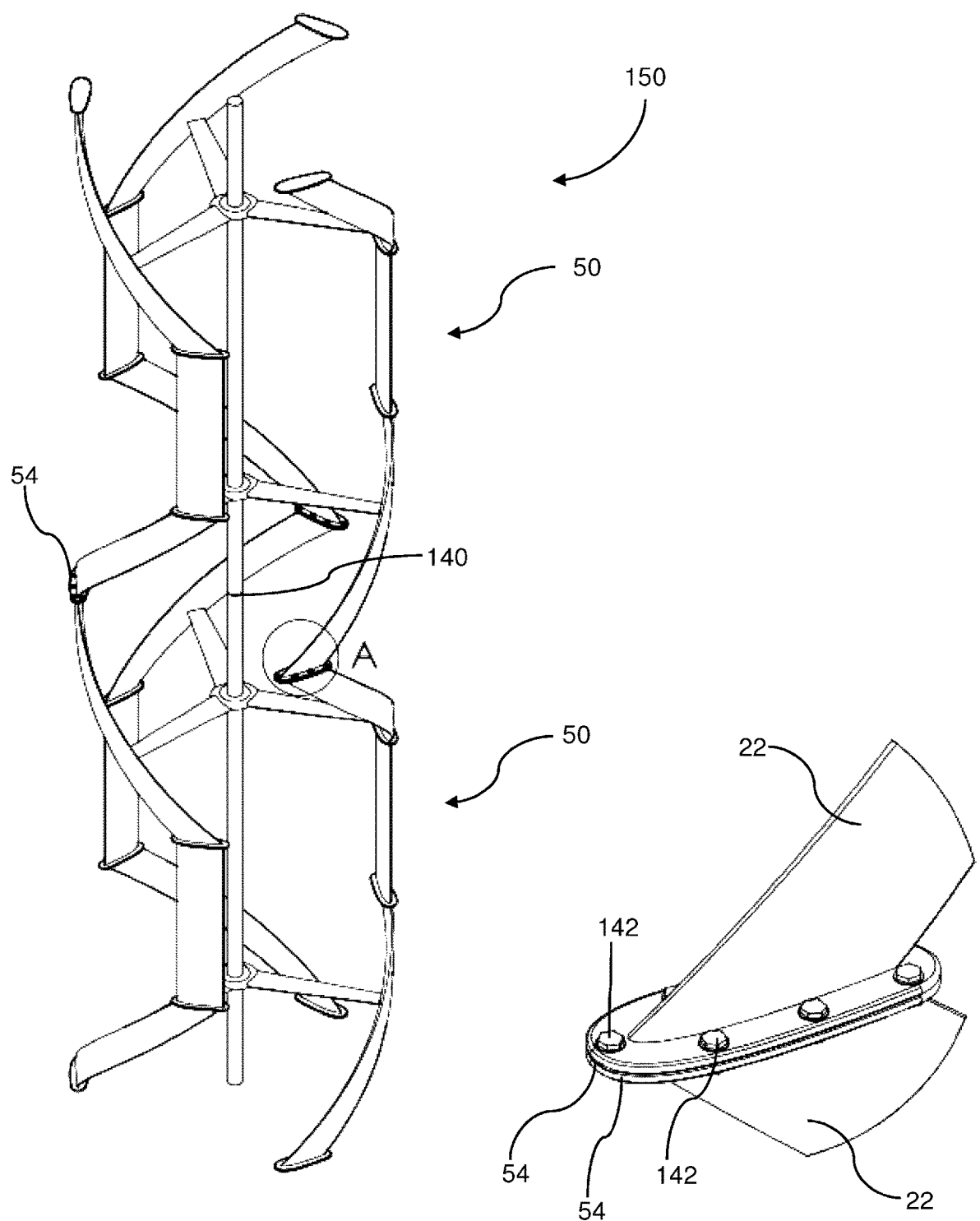
FIG. 14 shows an example of a single tower mast comprising more than one turbine of FIG. 2.
FIG. 15 shows detail of portion A of FIG. 14.

Referring to FIGS. 14 and 15, a tower configuration 150 exemplified for the turbines 50 is shown, including an example of a connecting mechanism for the helical sections 22 at end plates 54. The end plates 54 can be connected by any practicable means, exemplified in FIGS. 14 and 15 by bolts 142 passing through the end plates 54 of both helical sections 22 to be connected. These connections effectively stabilise the tower of turbines 50.

Figure 16:
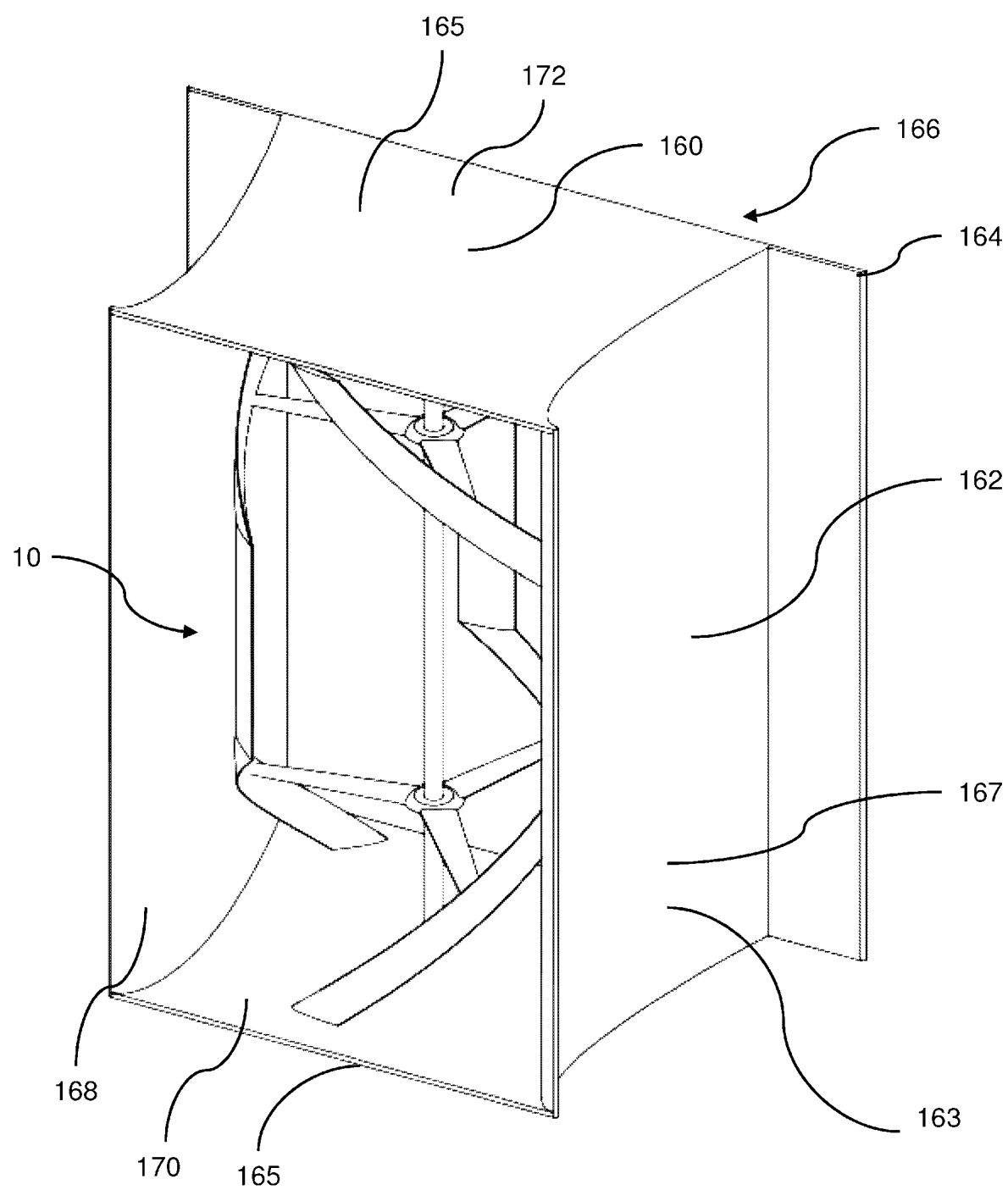
FIG. 16 shows a turbine of FIG. 1, inside a duct.
Figure 17:
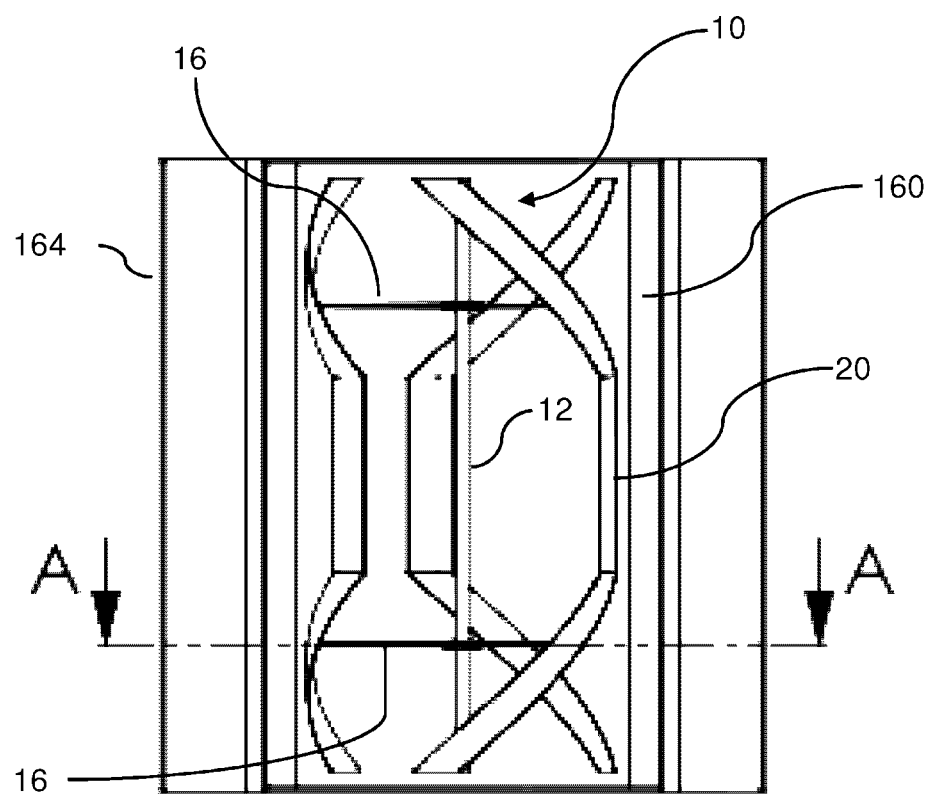
FIG. 17 shows a cross sectional view of the turbine in the duct of FIG. 16.
Figure 18:
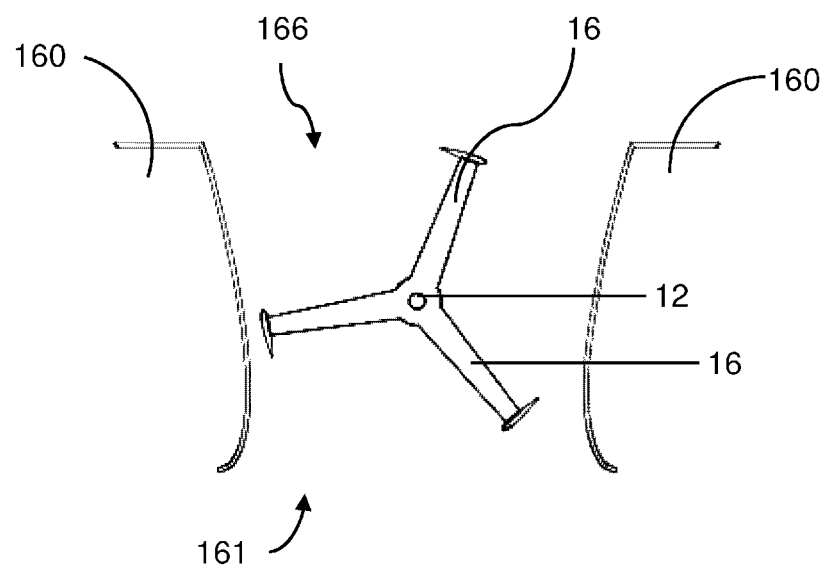
FIG. 18 shows a section through A-A in FIG. 17.
Figure 19:
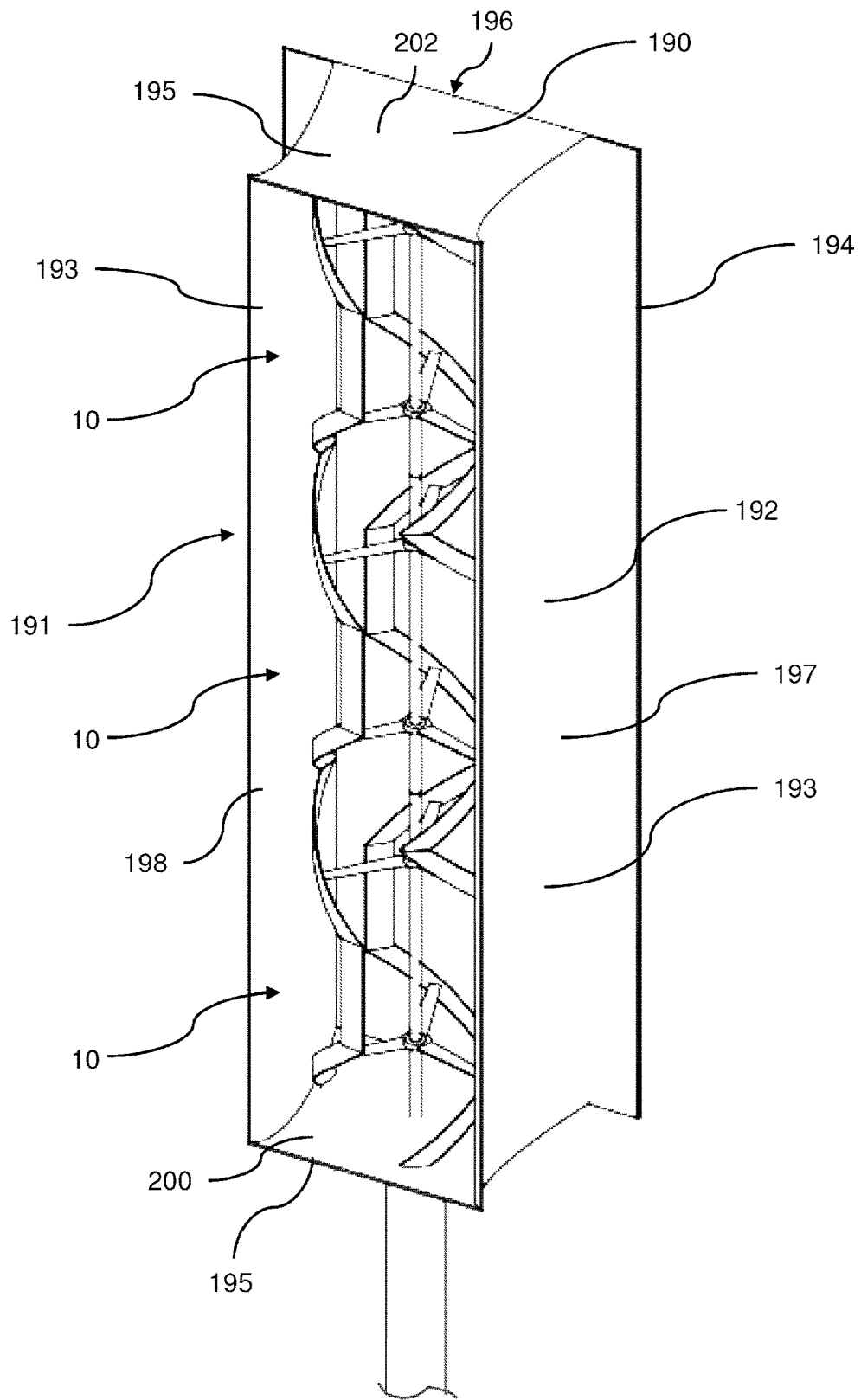
FIG. 19 shows an example of a single tower mast of FIG. 12, inside a duct.

FIGS. 16, 17 and 18 show a turbine 10 in a duct 160. FIG. 19 shows the turbine tower of FIG. 12, that is a plurality of turbines 10, in an elongate duct 190. The ducts 160 and 190 are shaped to direct a flow of fluid, for example air, onto inlets 161, 191, respectively, and across the turbine 10. Sides 162, 192 of the ducts 160, 190, respectively, have a diffuser-like shape to create a low-pressure area at the back of the turbine 10 that increases flow velocity inside the duct through a suction effect.

The ducts 160, 190 have two opposed operatively vertical sidewalls 163, 193 and two opposed operatively horizontal sidewalls 165, 195. The sidewalls 163, 193, 165, 195 are of curved sheet material, such as bent or shaped metal or any other suitable material. At least the sidewalls 163, 193 are shaped so that inner surfaces 168, 198 of the sidewalls 163, 193 have an inner airfoil-shaped profile that projects inwards when viewed from operatively above the ducts 160, 190. It follows that outer surfaces 167, 197 of the sidewalls 163, 193 have a corresponding profile. The airfoil shape can be an NACA airfoil shape.

The horizontal sidewalls 165, 195 can also be shaped so that inner surfaces 170, 200 have an inner airfoil-shaped profile that projects inwards when viewed from a side of the ducts 160, 190. It follows that outer surfaces 172, 202 of the sidewalls 165, 195 have a corresponding profile. The airfoil shape can be an NACA airfoil shape.

Outlets 166, 196 of the ducts 160, 190 have flange plates 164, 194 extending transverse to a flow of air through the ducts. These flange plates enhance the ability of the ducts to draw in more flow thereby further improving the energy extraction process as the turbine 10 operates with an increased flow speed.

The ducts 160 and 190 can rotate independently of the turbine 10 and automatically yaw so that the inlets 161, 191 face into the flow direction due to their shape and the flange plates at the outlets 166, 196. In one example, the ducts 160 and 190 can be connected to the turbine shaft through bearings positioned on their top and bottom plates. In another example, where the flow is constantly unidirectional (for example in a river stream), the ducts 160 and 190 can be fixed to the tower and only the turbine 10 rotates.

Figure 20:
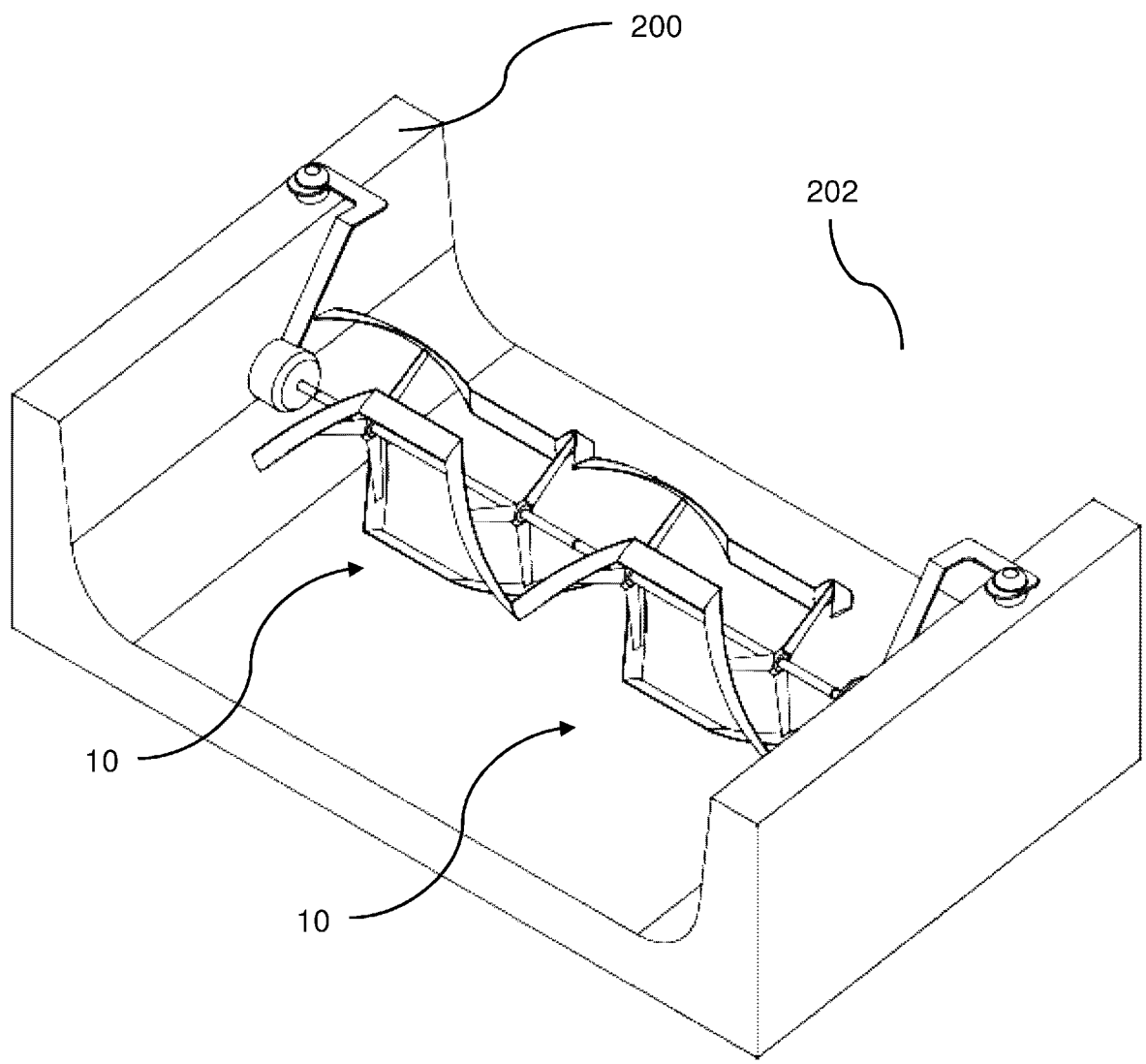
FIG. 20 shows an example of a horizontal arrangement of more than one turbine of FIG. 1, inside a duct.

FIG. 20 illustrates a section of a turbine configuration of the invention that is intended for use in a waterway, where the flow may be consistently unidirectional. For example, as illustrated in FIG. 20, two turbines 10 can be configured horizontally in a waterway, such as an irrigation canal 200, with flow direction 202. This example highlights the multiplicity of configurations and applications for the various embodiments of the turbines described herein.

Helical blades can enhance start-up capabilities and reduce torque fluctuations. However, they do create less net positive torque than vertical blades when operating at medium to high rotational speeds. This can result in less power generated for the same size vertical blade. Vertical blades can lack self-start capabilities and gaps between subsequent vertical blades can result in high torque fluctuations that are undesirable. The hybrid blades 14, 52, 62, 72, 82, 92, 102, that include the vertical and helical sections 20, 22, have a higher efficiency than an entirely helical blade in most operating conditions and, unlike an entirely vertical blade, provide the rotor 11 with self-start capabilities and an operation with minimised torque fluctuations. The hybrid blades referred to above can all have the same airfoil shape profile described with reference to the blades 14.

The helical sections are positioned, because of the wrapping, to achieve start-up of the turbine for substantially any incoming flow direction. The helical sections also serve to extend across gaps between the vertical blade sections. As a result, zones in which no torque is produced can be limited. The resultant limitation of torque fluctuation results in a minimisation of levels of vibration and allows for a limitation of the complexity of power electronics associated with the energy sink.

The blades of the various embodiments described herein are optimised so that the turbine is suited for operation in built environments as described below. During optimisation, it was decided that the influence of solidity and turbine overall dimensions as well as aspect ratio would be greater than airfoil shape, chord length, pitch angle and connection location.

Solidity is the area that the blades cover divided by the swept area of the turbine. There is an optimal solidity for which a maximum achievable Cp (Coefficient of Performance) is achieved at a specific value of TSR (Ratio of rotational speed over wind speed). For example, Cp is the ratio of actual electric power produced by a wind turbine divided by the total wind power flowing into the turbine blades at a specific wind speed.

In one example, at least the turbines 10, 50, 60, 70, 100 have a solidity of approximately 0.64. Such a solidity is regarded as quite high. It was thought that the solidity should be approximately 0.3. The hypothesis was that at 0.64 the solidity would be past its optimal value, meaning that the maximum achievable Cp value could be significantly higher than 0.24, which had been achieved during development of the turbines, if solidity was reduced. To verify or refute this hypothesis, a variation featuring blades with a chord length of 125 mm (instead of 200 mm used to achieve the solidity of 0.64) was modelled. This resulted in a solidity of 0.4, that is, a 37.5% reduction in solidity. The variation was studied for TSR from 2.5 to 4.5 where a drop off was observed. It achieved an optimal Cp value of 0.18 for TSR=4 and the Cp Vs TSR curve obtained was relatively flat, suggesting that the 0.4 value for solidity was too low. This refuted the hypothesis and was unexpected.

In order to verify that the CFD modelling results were correct and not caused by inappropriate user input, 2D simulations with a fine mesh using a y+ value of approximately 1 were carried out for all TSR analysed with the variation having the reduced chord length. The 2D simulations only captured flow at the mid-section of the turbine. As a consequence, they were representative of what was happening in the vertical section only, not the helical sections. The vertical sections of one variation achieved a Cp of 0.313, while that of another variation only reached a maximum of 0.231. This further proved that the low solidity turbine did not perform as well as the higher solidity one, and that the 0.4 value for solidity was already beyond optimal despite expectations. Possible reasons were investigated, and the one that was retained was that the Reynolds number was too low for the low solidity turbine. As discussed previously, the performance of an airfoil is Reynolds-number dependent. At low Reynolds numbers, the viscous effects become very important and the flow detaches earlier causing additional drag and low lift. Since the Reynolds number is directly proportional to the chord length of the airfoil, reducing the chord length caused both the solidity and the Reynolds number to drop. In order to increase the Reynolds number, it was necessary to increase the chord length. However, this would further increase solidity of the turbine were its dimensions to remain the same.

Varying the turbine overall dimensions by changing its aspect ratio, keeping the solidity and swept area the same, was tested. It was expected that a wider turbine would perform better, albeit rotational speed would be decreased. The blades in a wider turbine would be further apart and further from the central shaft, resulting in less wake interaction. The dimensions of a first turbine were 2.4 m height by 1.25 m width, resulting in a 1.92 aspect ratio. A second turbine was created with an aspect ratio of 1, approximately 1.732 m in both height and width. The chord length of the blades was increased from 200 mm to 277 mm, resulting in the solidity remaining 0.64 while the Reynolds number doubled, assuming the optimal TSR remained the same. In reality, the optimal TSR would be lower for the wider turbine, however, the reduction in TSR would not be significant resulting in an improvement in Reynolds number (although not doubling). The hypothesis was that this turbine configuration would result in higher overall Cp at the expense of higher torque fluctuation. The diameter being larger the gaps between the blades were also bigger. In order to quickly understand the new configuration's behaviour, 2D simulations of the midsection at various TSRs were carried out. CFD modelling yielded a maximum Cp of 0.41 for a TSR=2. This was a large improvement on any of the 2D simulations undertaken previously where maximum Cp was 0.313 for other embodiments.

Following the results obtained in 2D modelling, a 3D simulation was carried out to determine whether these results would translate into the full blade and not just the mid-section. This was not the case as the overall Cp remained approximately the same. Investigation of the torque produced by each section of the blades showed that the vertical section of the blades achieved a Cp of only 0.3, lower than 0.34 obtained with the previous variations and also relatively far away from the 0.41 figure obtained using 2D modelling.

These unexpected results were investigated further to find the cause of the discrepancy. Visual data including pressure and vorticity contours were generated. These showed that in the second turbine (aspect ratio of 1), there were much larger vortices being created at the junction of the helical and vertical sections. The vertical sections being shorter than in the other configurations, these vortices impacted the blade over a larger proportion, hence the 2D behaviour was only observed in a very small area around the mid-section. In the first turbine, the vortices only impacted a small area near the junction, so most of the vertical section behaved like the 2D modelling of the mid-section. To overcome this issue, two options were envisaged: one was to try to reduce the vorticity in that area using secondary devices such as end plates, the other was to increase the length of the vertical section so that it would behave closer to what it did in the 2D simulation. An example of increased length of vertical sections 20 is shown in FIG. 8. The second option was selected first, the logic being that if it worked then further reducing vorticity would only result in further improved performance.

A third turbine was created. It featured the same width as the first turbine since it is that width that resulted in a Cp of 0.41 for the vertical section in 2D modelling. Height was 2.598 m, resulting in an overall swept area of 4.5 m$^2$. To further increase torque production of the vertical section, the proportion of the vertical sections was increased from 33 percent to 40 percent. The inclination of the vertical sections was only slightly increased from 48 to 51.5 degrees to avoid having gaps that were too large between the blades. This meant that gaps increased from 229 mm to 557 mm, which is narrower than in the second turbine where gaps reached 899 mm.

The hypothesis was that this configuration would have a much larger Cp than previously obtained as a result of the vertical section acting as in 2D modelling, and that while torque fluctuation would be larger than that of the first turbine it would be much smaller than that of the second turbine. 3D modelling of the third turbine showed an overall Cp of 0.27, with the total torque varying between approximately 9 and 33 N.m. This confirmed the hypothesis. Investigation of each section revealed that the vertical section reached a Cp of 0.37, higher than ever before and closer to the 0.41 value obtained using 2D simulations. The helical section's performance remained the same with a Cp of 0.25.

The torque remained positive at all times. However, the fluctuation being larger than with the first and second turbines, it was decided to investigate if they could be reduced by further increasing the height of the turbine and having the helical sections wrap around more thereby reducing the gaps between the blades.

This fourth turbine featured blade sections of exactly the same proportions as the first turbine, but the overall dimensions of the turbine were 3.32 m high and 1.732 m wide, resulting in a swept area of 5.76 m2. The hypothesis was that such a turbine would still provide the benefits of a higher Cp with lower fluctuations. CFD modelling yielded a Cp of 0.28 and torque fluctuations were reduced by 32% when compared with the third turbine.

A 3D simulation of the first turbine was carried out with a 12 ms$^{-1}$ wind speed to check the influence of the Reynolds number and compare these results with what were claimed by manufacturers. It was assumed that Cp would be larger simply due to the fact that Reynolds number would increase with an increase in wind speed, everything else remaining equal. Indeed, Cp reached 0.267 thereby confirming that the higher the incoming wind speed (hence the higher the Reynolds number), the better the performance. From there on, it was assumed that Cp would always be higher when the incoming wind speed is increased. While tests were focussed on developing a turbine that is efficient in a wind speed of 8 ms$^{-1}$, the first turbine would therefore perform better when wind speeds are higher.

It was decided to investigate the use of the end plates, for example the end plates 54, 104, to check if they could further improve the performance obtained with the fourth turbine. It was hypothesised that end plates located at the junction between the helical and vertical sections of the blades would prevent the flows on each section from mixing together, thereby minimising destructive interaction and enhancing Cp of each section. It was also assumed that using end plates at the tips of the blade would limit shedding of blade tip vortices, hence increasing Cp of the helical section. Such end plates would have other benefits such as to provide platforms to lock two modules together, and potentially lock the various blade sections together (instead of manufacturing a single piece blade). The CFD simulation showed that these two hypotheses were partly correct: Cp of the vertical sections increased from 0.38 to 0.41 while the tips negative Cp contribution decreased from −18% to −3%. However, the Cp of the helical sections did not change much, suggesting that the end plates have little effect on the flow over helical sections. Also, the end plates added drag which reduced the overall torque by 8%. This offset some of the gains made elsewhere, and the overall Cp increased from 0.28 to 0.29.

Unexpectedly, adding end plates had a very positive impact on torque ripple which further reduced by almost 30%. All these factors combined meant that this was the preferred configuration in terms of aerodynamics.

Turbine rotor optimisation entailed a total of 60 CFD simulations, most of which were 3D and transient. Over the course of this phase, a large number of configurations and shapes were investigated, assessed and compared to each other. The results facilitated an informed decision as to which way to proceed and to arrive at an optimised design.

An embodiment of a wind turbine or rotor, such as that shown in FIGS. 1, 2, 7, 10, 11, is 3.33 m high by 1.73 m wide, resulting in a 5.76 m$^2$ swept area. It features three blades, each of which is divided into three sections: a forward-slanting helical section 20 at the top, a straight vertical section 22 in the middle and a rear-slanting helical section 20 at the bottom. The three blades can be equally divided in various configurations. The blades use a NACA 0015 airfoil shape of 277 mm chord length, resulting in a solidity of 0.64. It is worth noting that the NACA 0015 airfoil is widely described in the scientific literature as providing a good balance between performance and structural strength.

Further to that, it is submitted that the airfoil shape would not affect performance of the turbine as much as more critical elements such as aspect ratio and solidity, hence more focus was put on the latter parameters. Other airfoil shapes are envisaged. Changing solidity or aspect ratio would however prove more difficult as it would result in changes in rotational speed and overall dimensions of the turbine with implications on all other components such as struts, drive-train, generator, etc.

With regards to the blade-shaft connections, struts provided better performance than end discs, which consequently were discarded. From a structural point of view, struts positioned along various locations on the blade allow for lower deflections. Rims were also investigated. But they did not provide aerodynamic or structural advantages. Placing the struts on the helical sections 22 away from the vertical section 20 and the tips had the lowest impact on performance while at the same time limiting deflection of both the tips and the midsection of the blades.

This turbine was able to achieve a Cp of 0.29 for an optimal tip speed ratio of 2 in an 8 m/s wind.

As demonstrated by the CFD simulations, Cp increases with incoming wind speed due to an improvement in the blade Reynolds number, meaning the flow attaches better to the airfoil, creating additional lift. A 21% increase in Cp was observed when increasing wind speed from 8 to 12 ms$^{-1}$ on an intermediate rotor configuration. It is expected that a similar trend would be observed with the various embodiments of the turbine described herein, suggesting that Cp could stand as high as 0.35 in a 12 m/s wind.

Static simulations also demonstrated that torque remained positive at all possible incident angles in a 3 m/s wind speed for an intermediate turbine configuration. Similar results would be expected with the various embodiments of the turbine described herein as it has the same solidity value as the intermediate turbine. Having positive torque at all times means greater self-starting capabilities of the turbine for such low wind speeds. A large number of other vertical axis wind turbines suffer from not being able to self-start due to large negative torque at low wind speeds. As a consequence, they must first use their generator as a motor to drive them up to a suitable rotational speed where torque becomes positive. Only then can they start producing power rather than consume it. In the built environment where wind speeds are low, it is likely that power generation of such turbines is greatly offset by their consumption.

Further to having a Cp potentially larger than other vertical axis wind turbines, CFD simulations have showed that torque fluctuations are low with a small trough between maximum and minimum torque values during operation at design wind speed. This is owing to the fact that the helical sections start producing positive torque before the larger torque peak from the vertical section happens, reducing the "dead areas" where no torque is produced usually encountered with straight-bladed vertical axis wind turbines. Gaps between blades were kept small enough by using an aspect ratio of 1.92. This results in low vibration, low power fluctuation and improved fatigue life.

While Cp may not be as high as that of some horizontal axis wind turbines, it is important to note that the rotor is omnidirectional and will cope better with the turbulent flows encountered in the built environment. Horizontal axis turbines need to yaw to the incoming wind and cannot cope with gusty, often direction-changing winds. Also, their blades are uniformly facing the same direction whereas those of vertical axis wind turbines all faces different directions, facilitating pick up of turbulent flows. Further to that, it should also be noted that the rotor has a low optimal tip speed ratio of 2, resulting in rotational speeds that do not exceed a few hundred RPMs. Horizontal axis wind turbines rotate much faster, which creates noise due to the vortices shed at such rotational speeds. Finally, the rotor is stackable, providing large power for a limited footprint and turbines can be placed in close proximity to potentially further increase their power production. On the other hand, horizontal axis wind turbines need to be placed far apart from each other to avoid negative interaction, resulting in low power density.

It is advantageous if a turbine is able to operate at wind speeds as low as 3 $ms^{-1}$. This does add a requirement that the turbine is able to self-start at such speeds. The embodiments of turbine described above are capable of starting at such low speeds.

The turbine has particular application in built environments. Such environments present challenges. Wind speed can be low. Flow can be turbulent. Space is limited. The turbine should be safe and quiet because of people working in or inhabiting the area. In such environments production should be reliable and occur for sufficient periods of time so that the energy is affordable and cost-competitive with an existing electricity supply grid.

In developing the turbine, an intermediate wind speed of 8 ms-1 was chosen for optimisation purposes. This wind speed is one that is frequently encountered in a built environment.

The combination of the helical sections and the straight sections described herein facilitates start-up, using the helical sections, and the straight sections to enhance efficiency and minimise manufacturing costs.

In various embodiments, the helical sections have a fixed pitch. It is possible that variable pitch sections could have better performance. However, a variable pitch helical section would require complex and expensive mechanisms to determine the optimal pitch angle at each blade location in the circle of rotation and for a given wind speed. Such higher costs can only be justified with large scale turbines.

In obtaining the results described herein, a coarse 3D simulation was used. It was found that the number of simulations required to replicate a wind tunnel test required excessive computational power. It was considered that simulating a known test carried out in a wind tunnel would provide an adjustment value that could be used with the coarse simulation to allow for informed decisions with regard to the development.

The ducts 160 and 190 (FIGS. 16 to 18) were optimised using a similar protocol to that adopted for the turbine. The principles used for optimising the ducts 160,190 were similar since the dimensions only vary with length, depending on a length of a rotor or turbine assembly positioned in the duct.

During optimisation, four shapes were shortlisted through previous research and internal CFD. Three had the same NACA-airfoil shape for the inner wall or side. This was done to allow assessment of the impact of the outer wall shape alone on the flow within the duct. A first duct had that same NACA-airfoil shape for the outer walls, resulting in an overall symmetrical airfoil wall shape. The second duct had a rounded outer wall shape. A third duct used an airfoil-shaped thin plate for the side walls. A fourth duct used multiple thin flat panels connected to each other to form a shape that approximately follows that of the inner NACA-airfoil shape from the other ducts. Although it was expected that the flow characteristics would be made worse by such a shape, this duct was deemed to be the most inexpensive to manufacture and it was worth assessing its merits in terms of performance to see if it should be considered.

All four ducts were modelled using both 2D and 3D simulations. In a similar way to the simulation of straight bladed vertical axis turbines, it was assumed that there would be little 3D effects across the entire height of the duct, except in the areas close to the top and bottom plates of the duct. This is because every horizontal slice of the duct has the exact same shape, but the top and bottom plates create friction that will impact the flow in their vicinity.

To validate this hypothesis, velocity contours of various horizontal slices, including the midsection, were obtained for all four duct shapes. Comparing them showed that velocity varied only by a slight amount across the height of the duct, up to a certain point near the top and bottom plates. In addition to that observation, the difference in terms of average velocity within the duct between 2D and 3D simulations varied at most by 11%, suggesting that flow within the duct is only slightly impacted by 3D effects. Consequently, it was decided that from that point on only 2D simulations would be carried on so as to speed up the process.

Two other hypotheses were made. One was that an inner NACA-airfoil shape in the third duct would provide increased lift directed toward the inside of the duct, hence augmenting flow within the duct more than the fourth duct would. CFD simulations yielded an increase in average velocity within the duct of 69% for the first duct, 51% for the second duct, 84% for the third duct and 45% for the fourth duct, thereby validating both hypotheses. This was the basis for the curved sheet material used for the ducts 160, 190.

The other was that the shape of the outer wall or side has a significant effect on the internal flow within the duct. This also proved true given the 22% difference in average internal flow velocity between the best performing and worst performing duct with the same NACA-shaped inner sides. The second duct produced only about half the power of the third duct. This supported the selection of the curved sheet material for the sidewalls 163, 165, 193, 195 for the ducts 160, 190.

It was observed that there was large flow separation near the inlet of the duct with the fourth duct, which was most likely responsible for its poor performance. To test this assumption, a fifth duct that featured a smaller inlet angle, was modelled. Velocity was increased by 59%, making it the third best performing duct investigated so far and proving that the inlet angle was too large, although it followed the NACA-airfoil shape of the others. However, this very high sensitivity to inlet angle meant that this duct would not cope as well with changing wind directions than others and was therefore discarded.

The third duct was considered as having the preferred shape owing to its superior performing. Consideration was then given to total duct length, which is directly related to footprint. In order to minimise the latter, duct length must be kept minimum, ideally about the same as turbine diameter. Sixth and seventh ducts were created with a total length of 1.87 m, down from the original value of 2.35 m. This is the length from the inlet to the outlet of the ducts. The sixth duct simply had its back end or outlet trimmed. The seventh had a scaled down chord length of the airfoil shape of the previous ducts. The goal was to determine whether trimming the end of the airfoil shape had small effects on the overall performance. The sixth duct increased flow by 59% and the seventh by 70%, demonstrating that tail of the airfoil matters.

Proceeding with the shape and length of the seventh duct, it was decided to explore the effects of varying the diffuser angle. In this situation where the NACA-airfoil shape was fixed, it meant changing the angle of attack. The original value was 3 degrees and the scientific literature suggested that further increasing the diffuser angle—up to 12 degrees—results in enhanced flow velocity within the duct.

This hypothesis was tested with two new ducts, in the form of an eighth duct and a ninth duct. The eighth duct featured a diffuser angle of 6 degrees. The ninth duct featured a diffuser angle of 10 degrees. They yielded flow augmentation by 65% and 62% respectively, down from 70% with the seventh duct. This was in contradiction with the scientific literature. Analyses of velocity and pressure contours showed that at the higher angles flow separation was more prominent which explains why such results were obtained.

The above description relating to the development of the duct is intended to demonstrate that the shape of the duct 160, 190 is not arbitrary. The seventh duct referred to above could represent the duct 160, 190.

The appended claims are to be considered as incorporated into the above description.

Throughout the specification, including the claims, where the context permits, the term "comprising" and variants thereof such as "comprise" or "comprises" are to be interpreted as including the stated integer or integers without necessarily excluding any other integers.

It is to be understood that the terminology employed above is for description of various embodiments and should not be regarded as limiting. The described embodiments are intended to be illustrative of the invention, without limiting the scope thereof. The invention is capable of being practised with various modifications and additions as will readily occur to those skilled in the art.

When any number or range is described herein, unless clearly stated otherwise, that number or range is approximate. Recitation of ranges of values herein are intended to serve as a shorthand method of referring individually to each separate value falling within the range, unless otherwise indicated herein, and each separate value and each separate subrange defined by such separate values is incorporated into the specification as if it were individually recited herein.

Words indicating direction or orientation, such as "front", "rear", "back", etc, are used for convenience. The inventor(s) envisages that various embodiments can be used in a non-operative configuration, such as when presented for sale. Thus, such words are to be regarded as illustrative in nature, and not as restrictive.

The invention claimed is:

1. A vertical axis turbine that includes:
    a rotatable hub assembly that is configured to be connected to an energy sink and rotatable about an axis of rotation; and
    at least two blades that are mounted on the hub assembly, each blade including a leading edge and a trailing edge, the blades being oriented so that the respective leading edges face in a common rotational direction, and each blade further including:
    a straight section that is substantially parallel to the axis of rotation; and
    two helical sections, the straight section being interposed between the helical sections, the helical sections extending at least partially around the axis of rotation, and the helical sections being substantially identical to each other.

2. The vertical axis turbine as claimed in claim 1, in which the blades are substantially identical to each other.

3. The vertical axis turbine as claimed in claim 1, in which the blades are substantially equally spaced from each other.

4. The vertical axis turbine as claimed in claim 1, in which the hub assembly includes a shaft and the helical sections of each blade extend in a common rotational direction about the shaft.

5. The vertical axis turbine as claimed in claim 1, in which the helical sections constitute between 30% to 80% of a span of each blade.

6. The vertical axis turbine as claimed in claim 5, in which the helical sections constitute two thirds of a span of each blade.

7. The vertical axis turbine as claimed in claim 5, in which the helical sections constitute one third of a span of each blade.

8. The vertical axis turbine as claimed in claim 1, in which the blades have a constant pitch angle along their lengths.

9. The vertical axis turbine as claimed in claim 1, in which the pitch angle of the blades varies along their lengths.

10. The vertical axis turbine as claimed in claim 1, in which the blades have a constant camber along their lengths.

11. The vertical axis turbine as claimed in claim 1, in which the blades have a camber that varies along their lengths.

12. The vertical axis turbine as claimed in claim 1, in which the blades are entirely without camber.

13. The vertical axis turbine as claimed in claim 1, in which the helical sections are cambered while the straight sections are without camber.

14. The vertical axis turbine as claimed in claim 1, in which the straight sections are cambered while the helical sections are without camber.

15. The vertical axis turbine as claimed in claim 1, in which the blades each have end plates at their tips.

16. The vertical axis turbine as claimed in claim 1, in which plates are provided at junctions between the helical and straight sections.

17. The vertical axis turbine as claimed in claim 1, in which the hub assembly includes a shaft.

18. The vertical axis turbine as claimed in claim 1, in which at least one strut connects each respective blade to the shaft.

19. The vertical axis turbine as claimed in claim 1, which includes three blades.

* * * * *